(12) United States Patent
Matsen et al.

(10) Patent No.: US 10,814,559 B2
(45) Date of Patent: Oct. 27, 2020

(54) METHODS OF MANUFACTURING MODULAR ROTOR BLADES

(71) Applicant: The Boeing Company, Chicago, IL (US)

(72) Inventors: Marc R. Matsen, Seattle, WA (US); Thomas K. Tsotsis, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 84 days.

(21) Appl. No.: 16/226,854

(22) Filed: Dec. 20, 2018

(65) Prior Publication Data
US 2020/0198252 A1    Jun. 25, 2020

(51) Int. Cl.
*B29C 65/00* (2006.01)
*B29C 65/02* (2006.01)
*B29L 31/08* (2006.01)

(52) U.S. Cl.
CPC .............. *B29C 65/02* (2013.01); *B29C 66/54* (2013.01); *B29C 66/721* (2013.01); *B29C 66/73921* (2013.01); *B29C 66/8145* (2013.01); *B29L 2031/08* (2013.01)

(58) Field of Classification Search
None
See application file for complete search history.

(56) References Cited

U.S. PATENT DOCUMENTS

| | | | |
|---|---|---|---|
| 9,610,654 B1* | 4/2017 | Matsen | B29C 66/81455 |
| 2012/0145703 A1* | 6/2012 | Matsen | H05B 6/105 |
| | | | 219/618 |
| 2017/0057618 A1* | 3/2017 | Khozikov | H05B 6/101 |

* cited by examiner

*Primary Examiner* — Jacob T Minskey
*Assistant Examiner* — Matthew Hoover
(74) *Attorney, Agent, or Firm* — Walters & Wasylyna LLC

(57) ABSTRACT

A method of manufacturing a rotor blade includes (1) assembling a first blade module that defines a first-module span axis and includes a first-module skin and a first-module spar, and each of the first-module skin and the first-module spar includes a first thermoplastic polymer and reinforcement material; (2) assembling a second blade module that defines a second-module span axis and includes a second-module skin and a second-module spar, and each of the second-module skin and the second-module spar includes a second thermoplastic polymer and reinforcement material; (3) transporting the first blade module and the second blade module to a field location; (4) aligning, at the field location, the first-module span axis with the second-module span axis to define an aligned pair of modules; and (5) heating a portion of the aligned pair of modules to form a weld joint between the first-module spar and the second-module spar.

20 Claims, 13 Drawing Sheets

# METHODS OF MANUFACTURING MODULAR ROTOR BLADES

TECHNICAL FIELD

The present disclosure generally relates to manufacturing composite structures and, more particularly, to systems and methods for manufacturing a plurality of modules at a factory location and assembling a composite structure from the plurality of modules at a field location.

BACKGROUND

The use of composite materials in various performance structures is becoming more frequent. Composite materials promote decreased weight, improved performance, and increased service life of structures. It is common for different composite parts to be connected to each other to form a structure. For example, composite materials are laid up to form a composite part, which is then joined with other parts (composite or otherwise) to form the structure. Conventional techniques of joining composite parts are often time- and resource-intensive and/or yield structures, having undesirable performance characteristics (e.g., heavy weight and/or low strength). Additionally, structures continue to increase in size and, accordingly, pose integrity, manufacturing, and transportation challenges. Accordingly, systems and methods, intended to address the above-identified concerns, would find utility.

SUMMARY

Accordingly, apparatuses and methods, intended to address at least the above-identified concerns, would find utility.

The following is a non-exhaustive list of examples, which may or may not be claimed, of the subject matter, disclosed herein.

One example of the subject matter, disclosed herein, relates to a system for manufacturing a rotor blade. The system comprises a first tooling. The first tooling is positioned at a factory location and is configured to assemble a first blade module. The first blade module comprises a first-module skin and a first-module spar. Each of the first-module skin and the first-module spar comprises a first thermoplastic polymer and a first reinforcement material. The system further comprises a second tooling. The second tooling is configured to assemble a second blade module. The second blade module comprises a second-module skin and a second-module spar. Each of the second-module skin and the second-module spar comprises a second thermoplastic polymer and a second reinforcement material. The system also comprises a first support. The first support is positioned at a field location and is configured to receive the first blade module. The system additionally comprises a second support. The second support is positioned at the field location and is configured to receive the second blade module. The system further comprises a spar welding assembly. The spar welding assembly is positioned at the field location and is configured to join the first-module spar with the second-module spar. The system also comprises a skin welding assembly. The skin welding assembly is positioned at the field location and is configured to join the first-module skin with the second-module skin. The system additionally comprises a transportation vehicle. The transportation vehicle is configured to move the first blade module from the factory location to the field location.

The system enables plurality of blade modules to be assembled at factory location, to be transported to field location, that is different than the factory location, and to be joined together at filed location to form rotor the blade. Accordingly, the system facilitates a reduction in manufacturing cycle time, an increase in production capacity, and a reduction in tooling costs.

Another example of the subject matter, disclosed herein, relates to a method of manufacturing a rotor blade. The method comprises assembling, at a factory location, a first blade module. The first blade module defines a first-module span axis $A_{M1}$ and comprises a first-module skin and a first-module spar. Each of the first-module skin and the first-module spar comprises a first thermoplastic polymer and a first reinforcement material. The method further comprises assembling a second blade module. The second blade module defines a second-module span axis $A_{M2}$ and comprises a second-module skin and a second-module spar. Each of the second-module skin and the second-module spar comprises a second thermoplastic polymer and a second reinforcement material. The method also comprises transporting the first blade module and the second blade module to a field location. The method additionally comprises aligning, at the field location, the first-module span axis $A_{M1}$ of the first blade module with the second-module span axis $A_{M2}$ of the second blade module to define an aligned pair of modules. The method further comprises heating a portion of the aligned pair of modules to form a weld joint between the first-module spar and the second-module spar.

The method enables modularity in design of the rotor blade. Modular design of the rotor blade enables a plurality of blade modules to be assembled at the factory location and to be connected together at the field location to form the rotor blade. Accordingly, the method facilitates a reduction in manufacturing cycle time, an increase in production capacity, and a reduction in tooling costs. Further, modular design of the rotor blade enables the plurality of blade modules to be transported from the factory location to the field location, rather than the rotor blade as a whole, which, in one or more examples, is extremely large when fully assembled. Accordingly, the method eases the challenges associated with transporting rotor blade in a fully assembled condition.

BRIEF DESCRIPTION OF THE DRAWINGS

Figure 1:
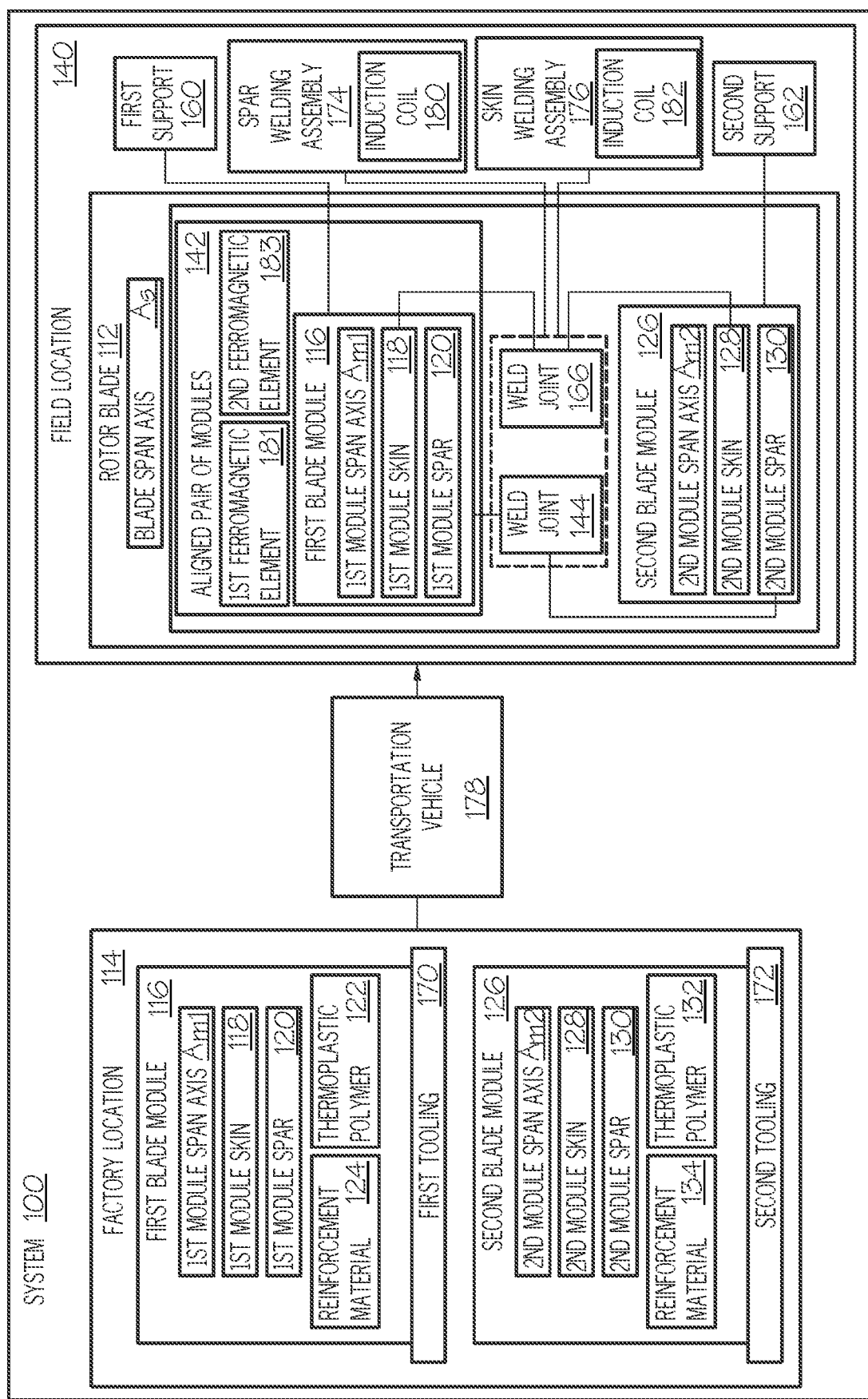
Figure 2:
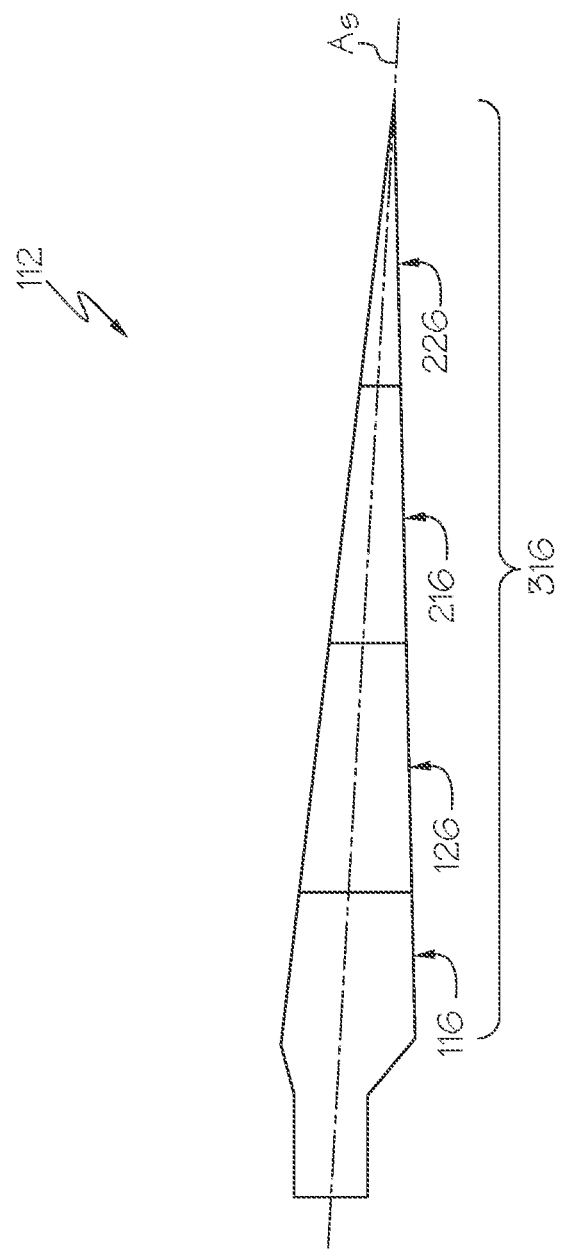
Figure 3:
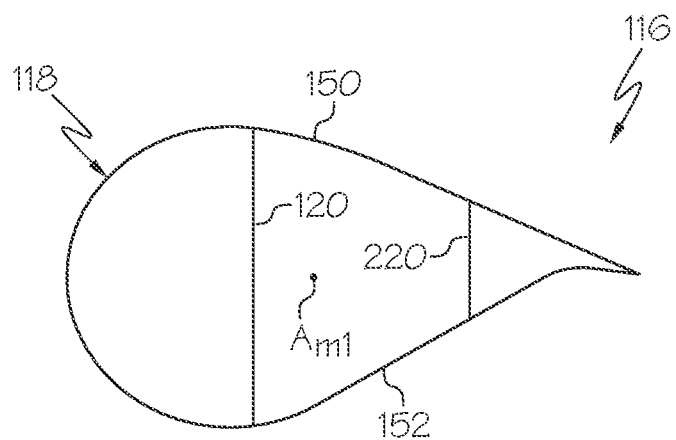
Figure 4:
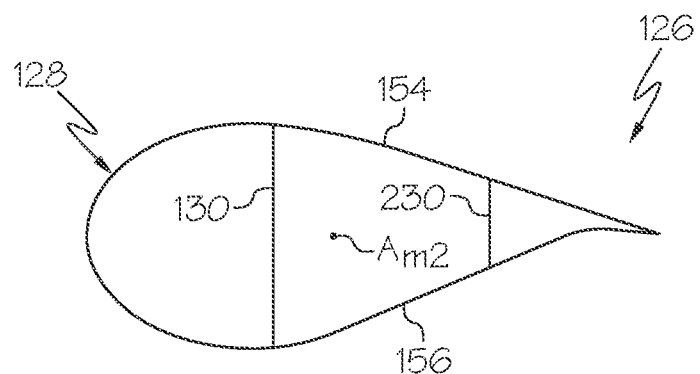
Figure 5:
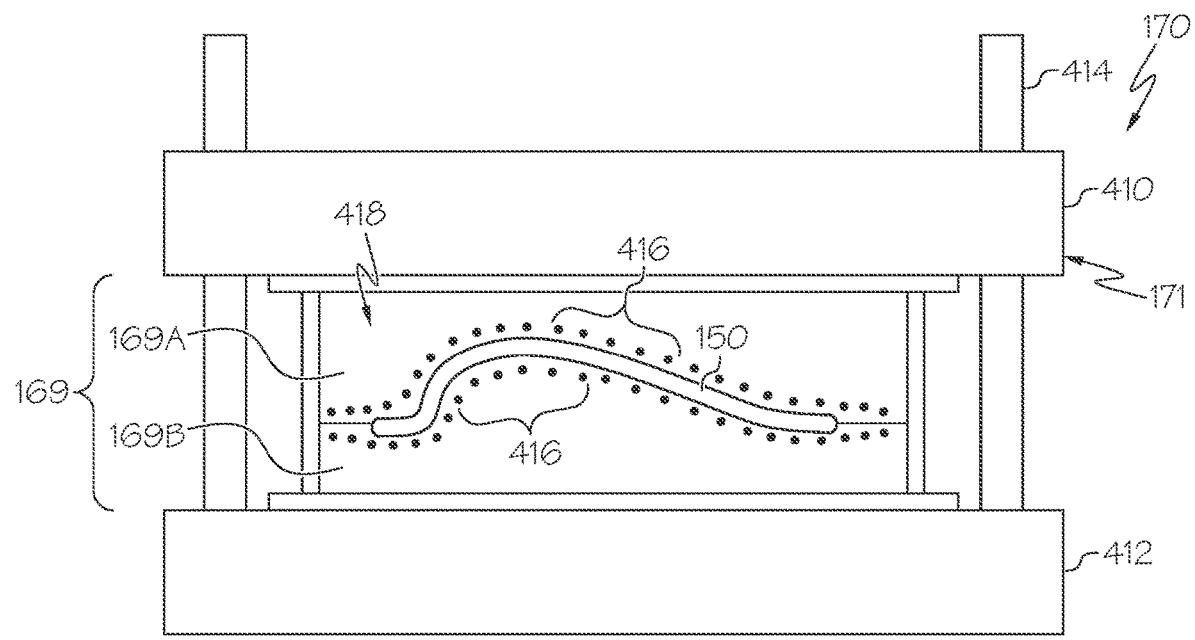
Figure 6:
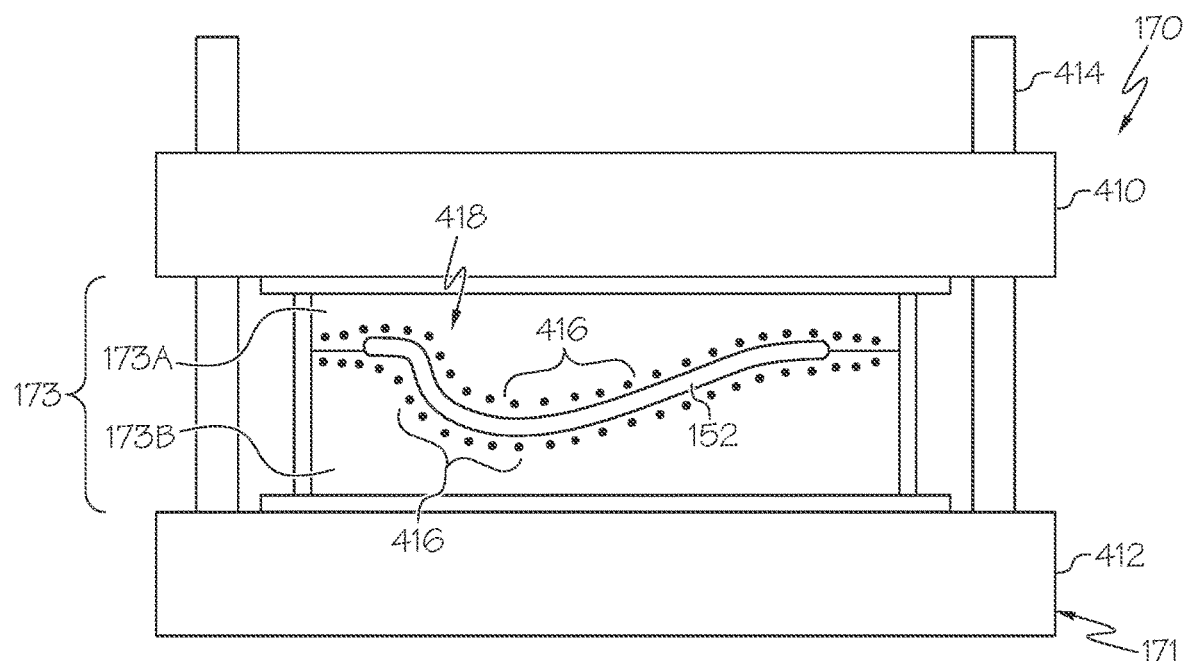
Figure 7:
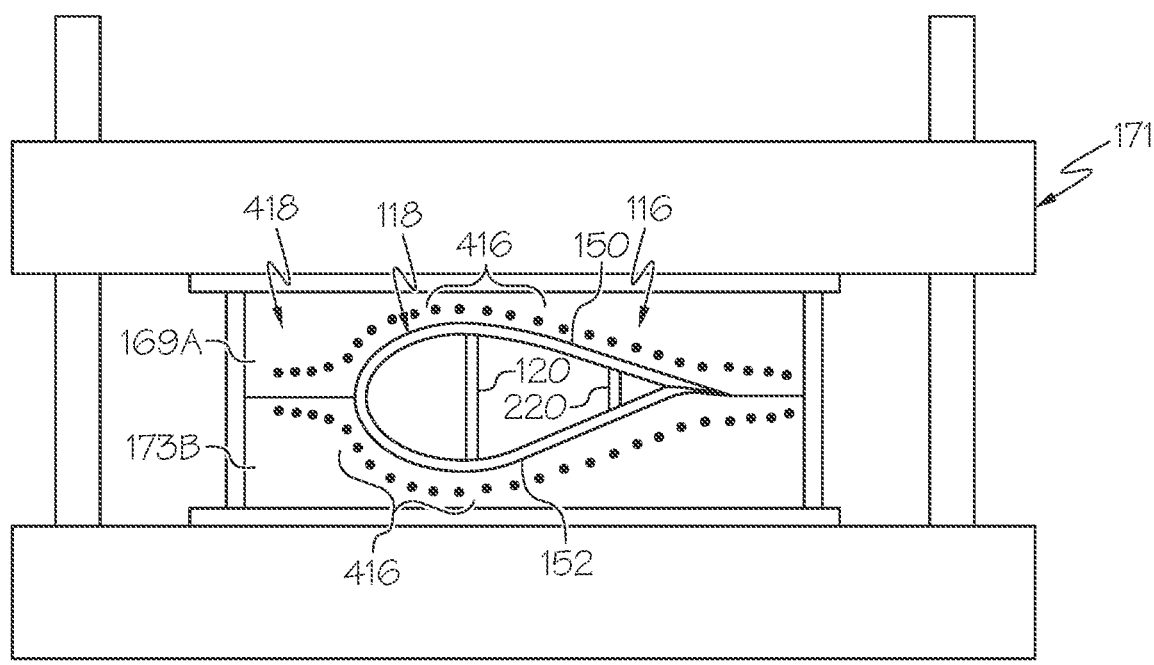
Figure 8:
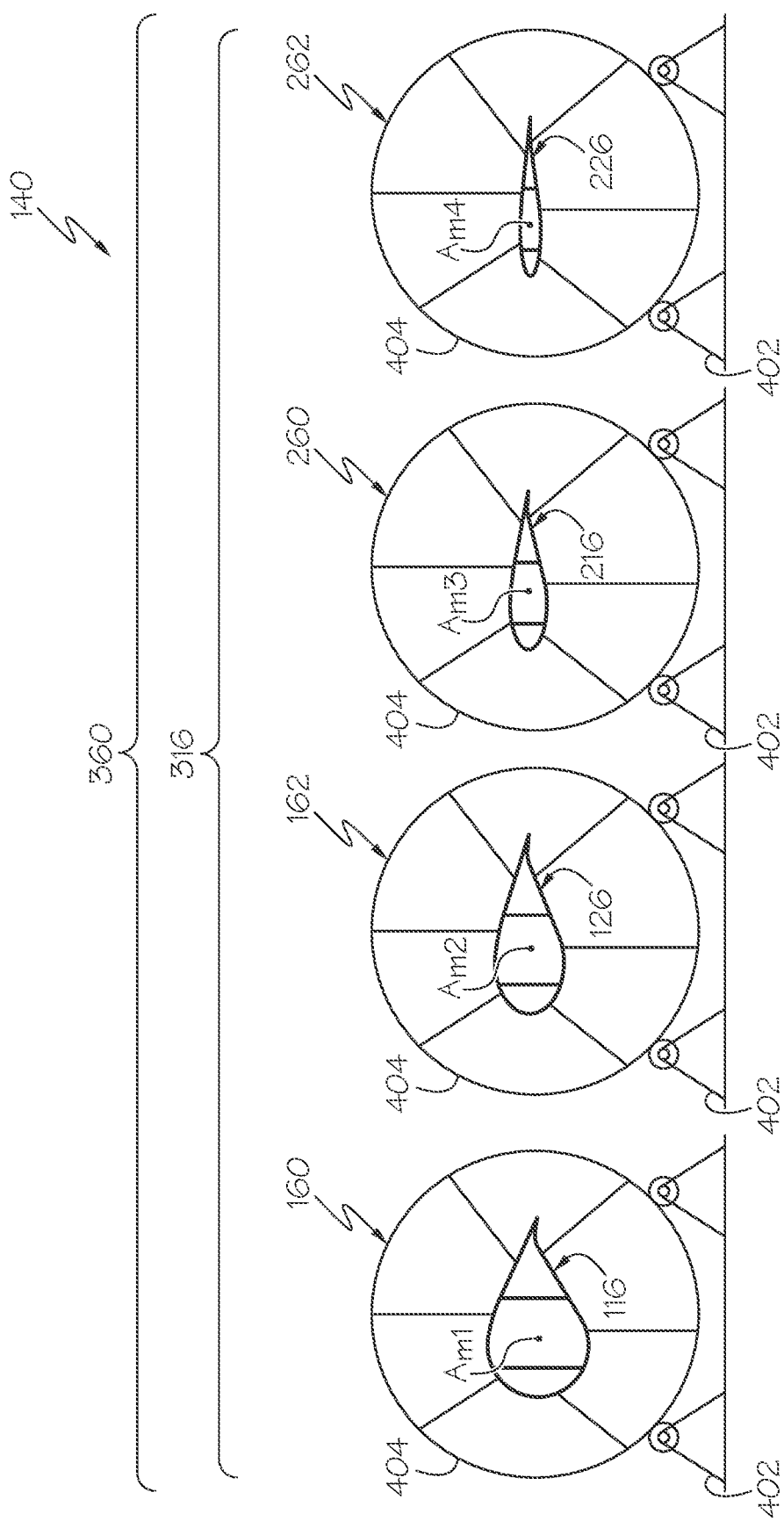
Figure 9:
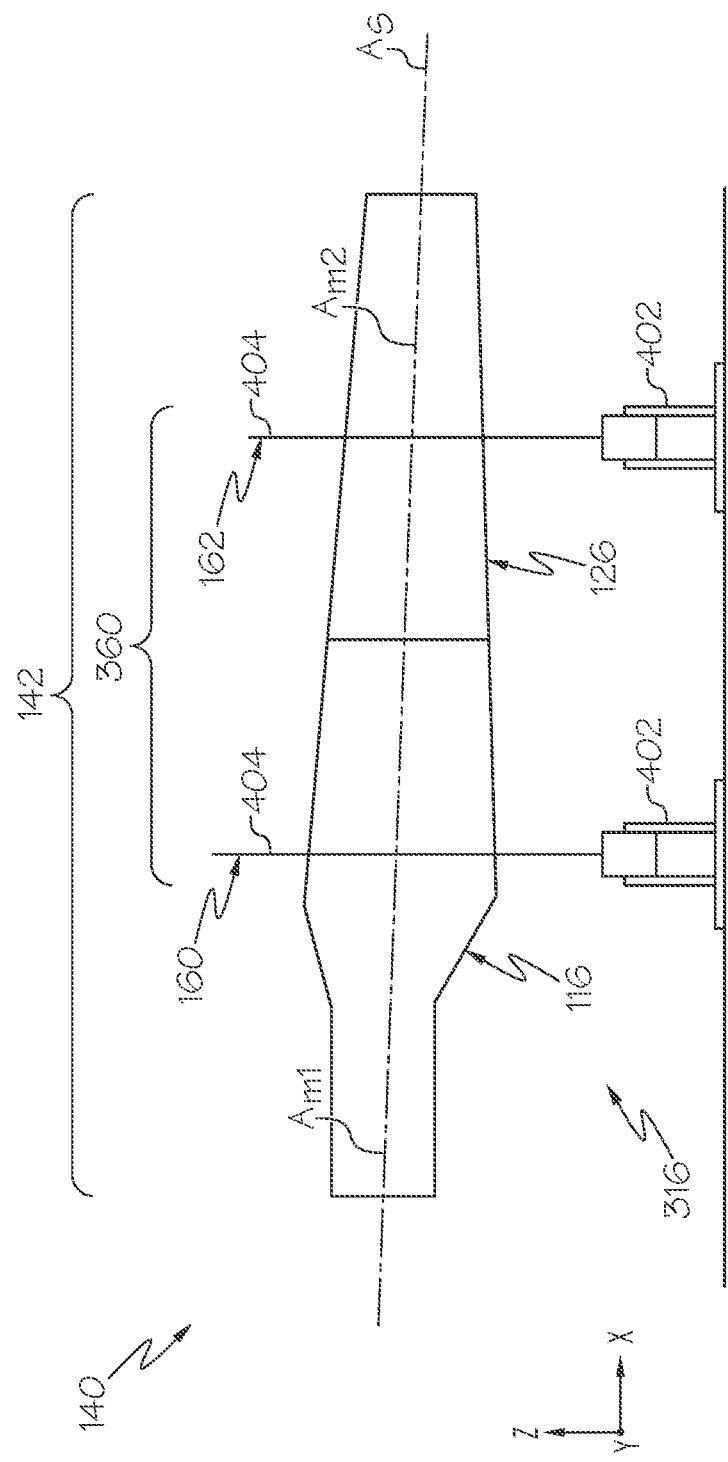
Figure 10:
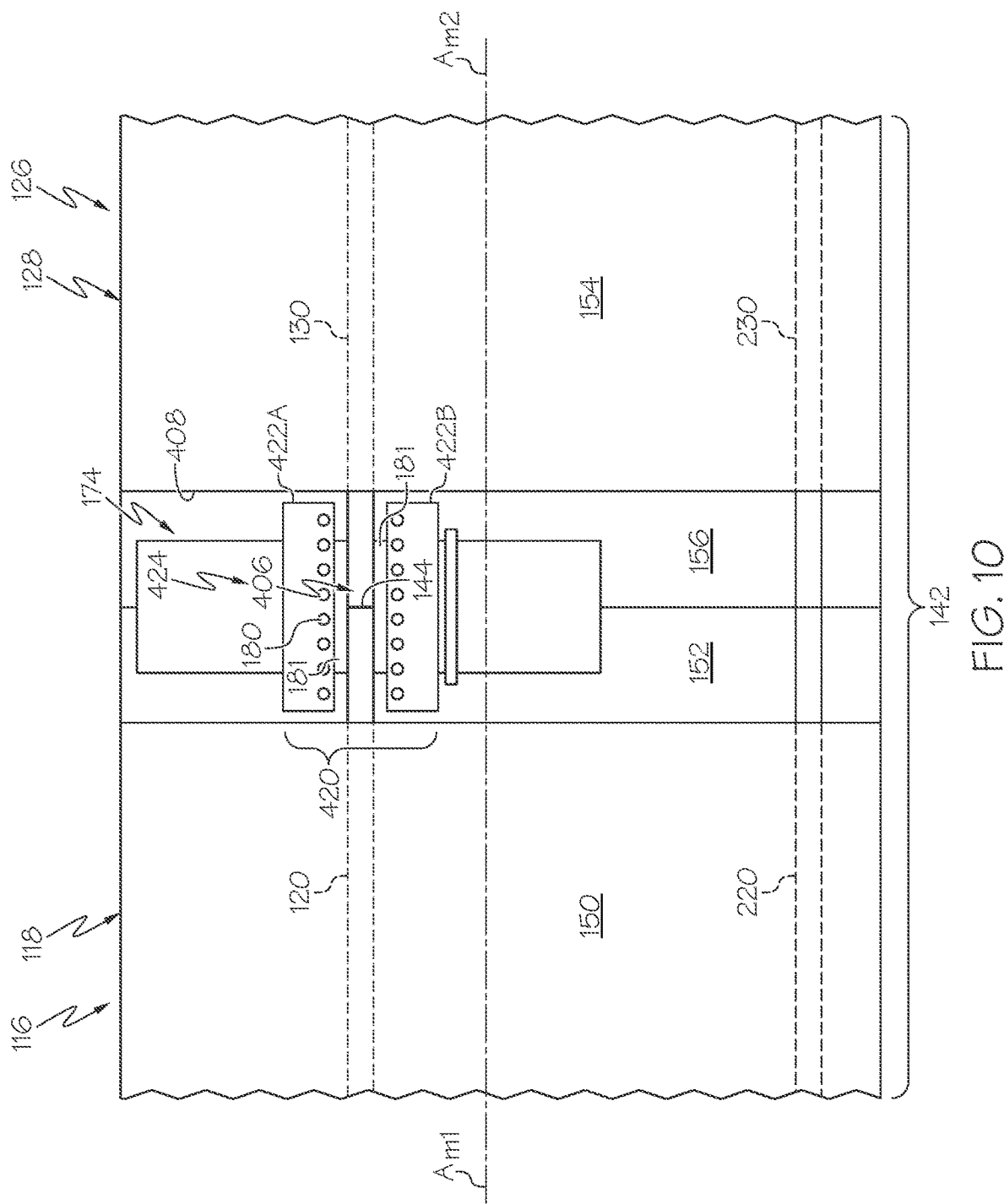
Figure 11:
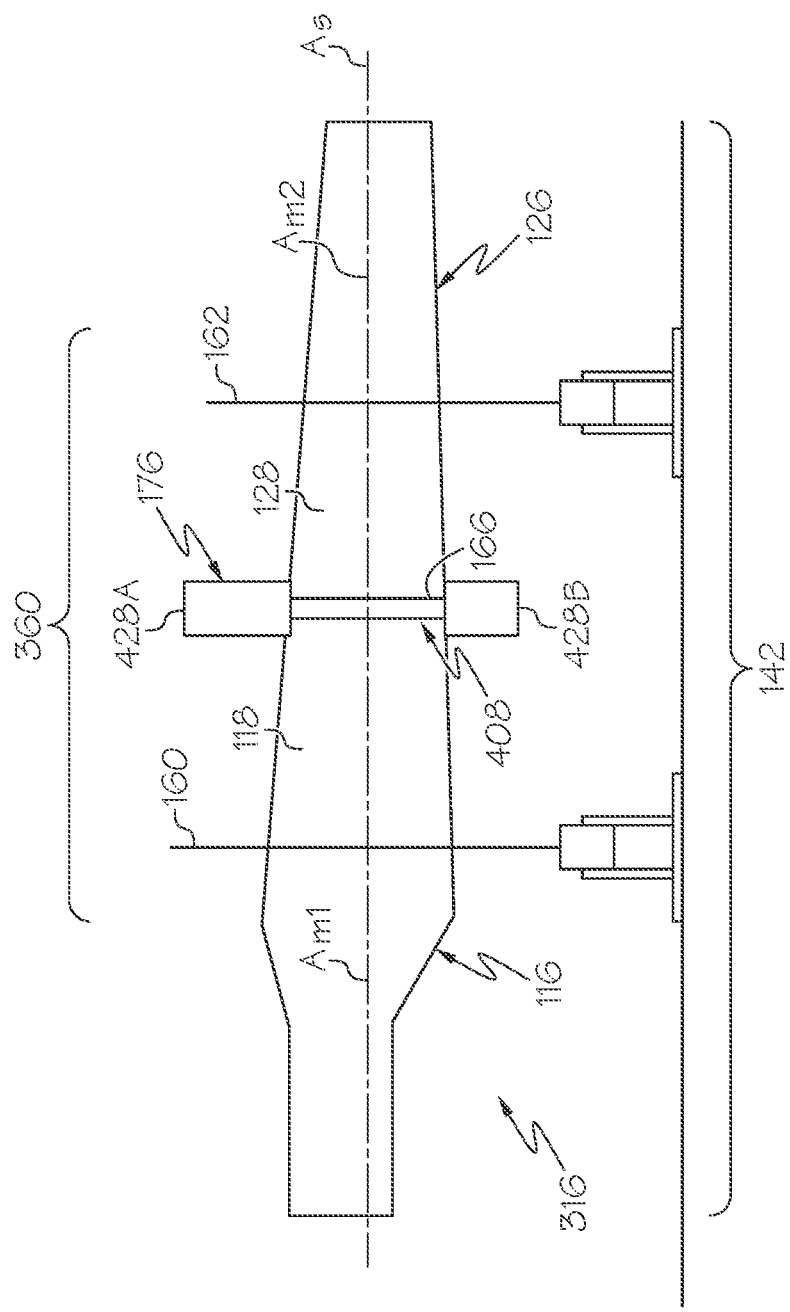
Figure 12:
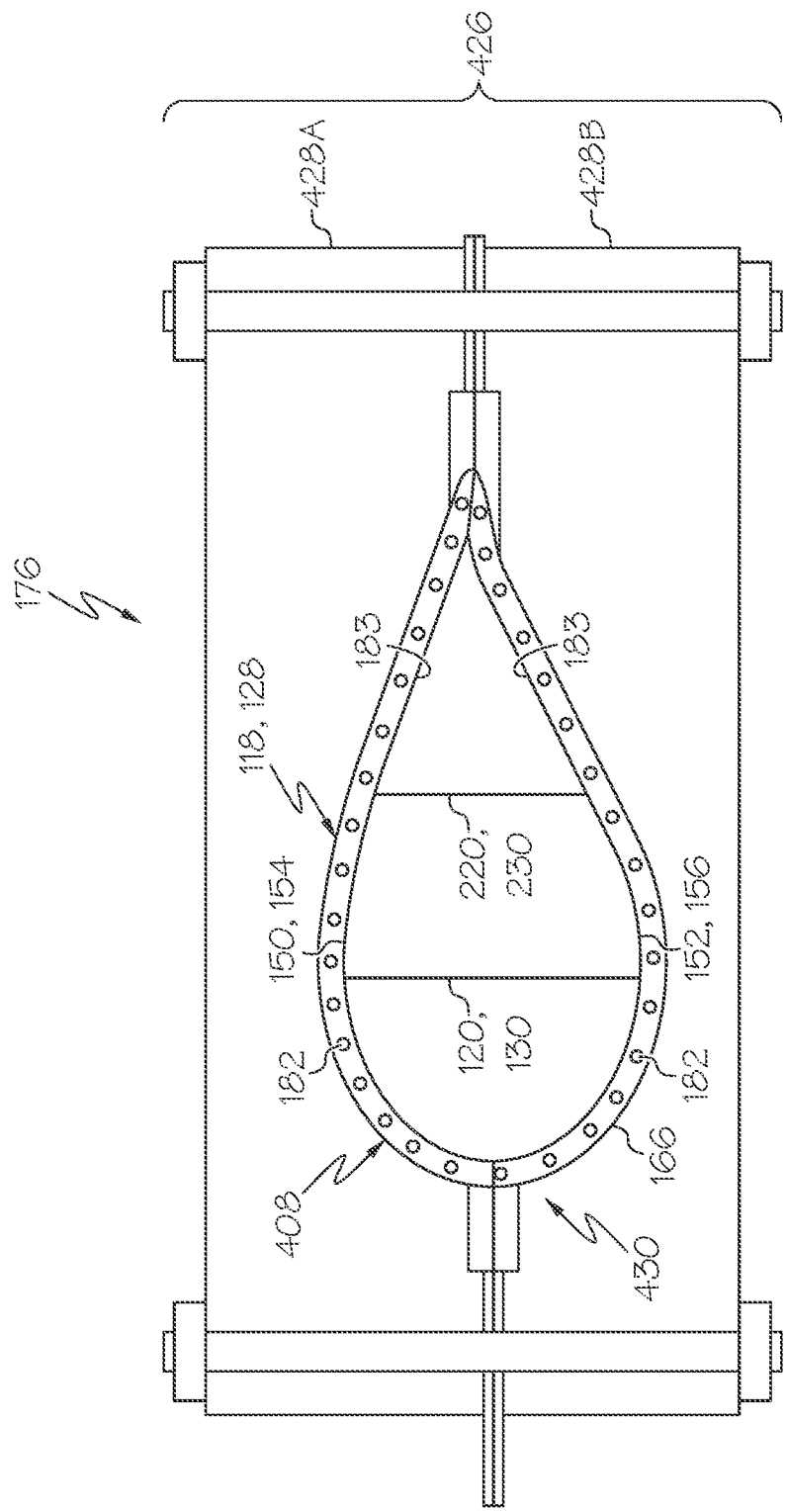
Figure 13:
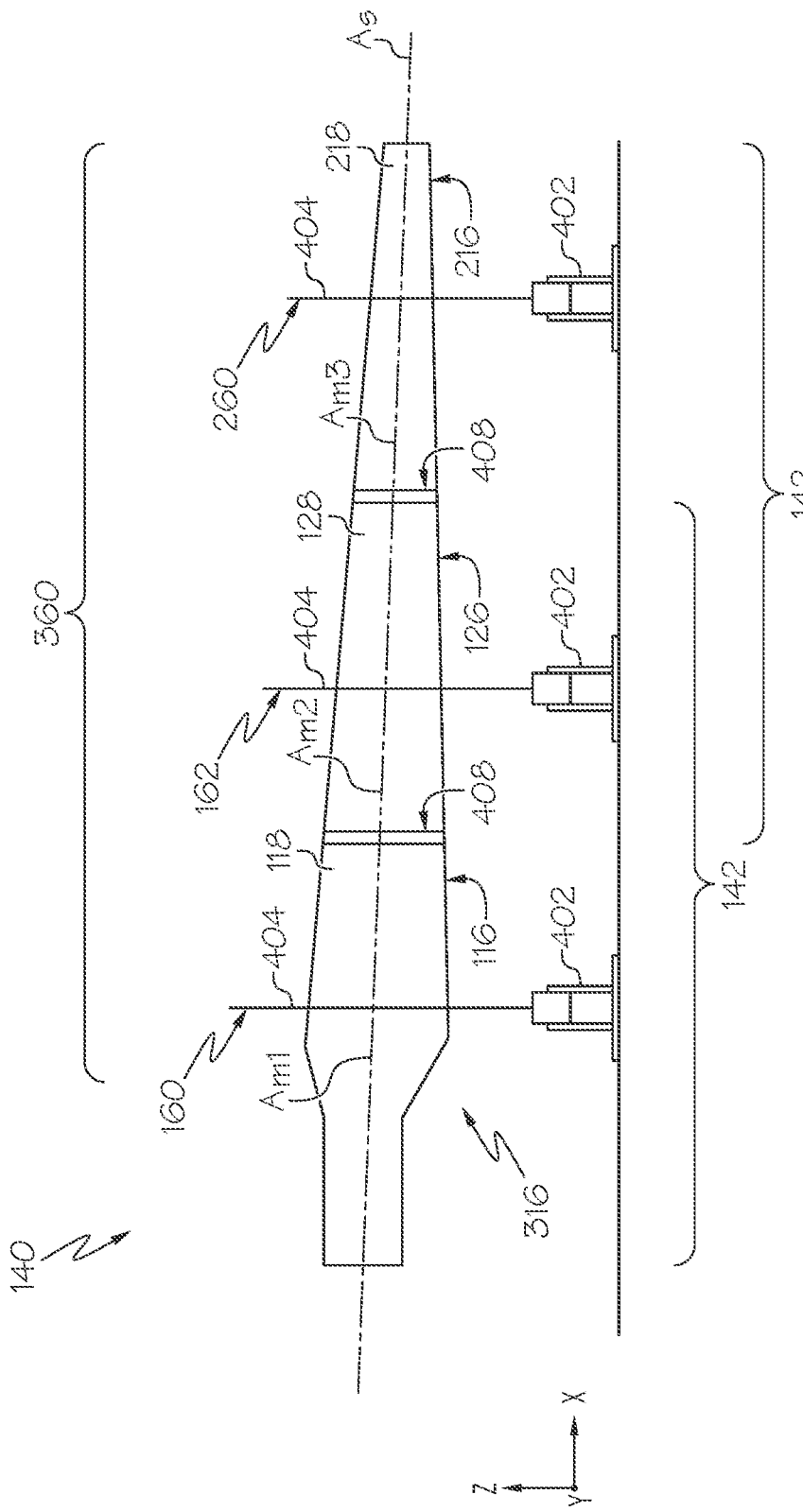
Figure 14:
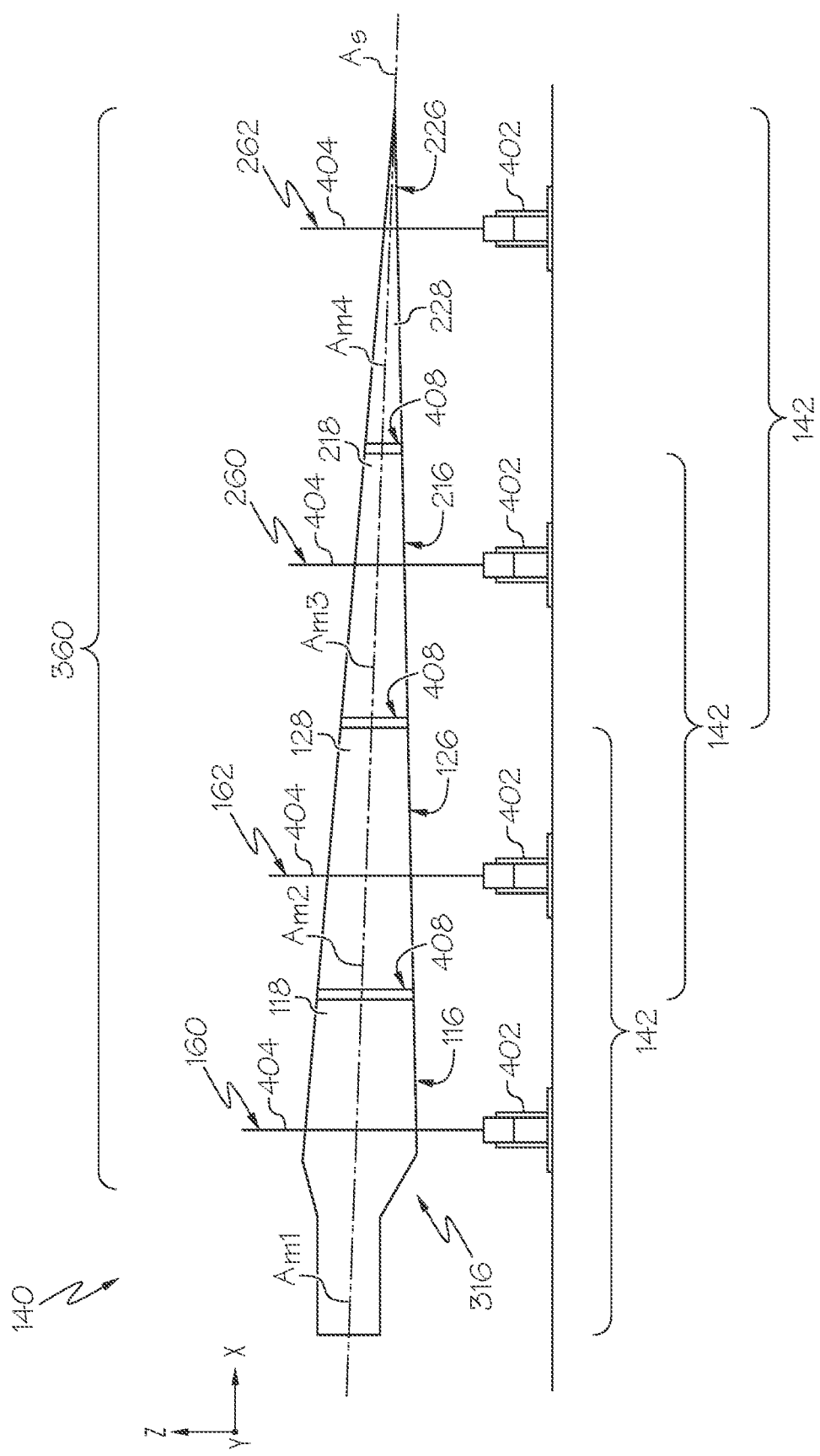
Figure 15:
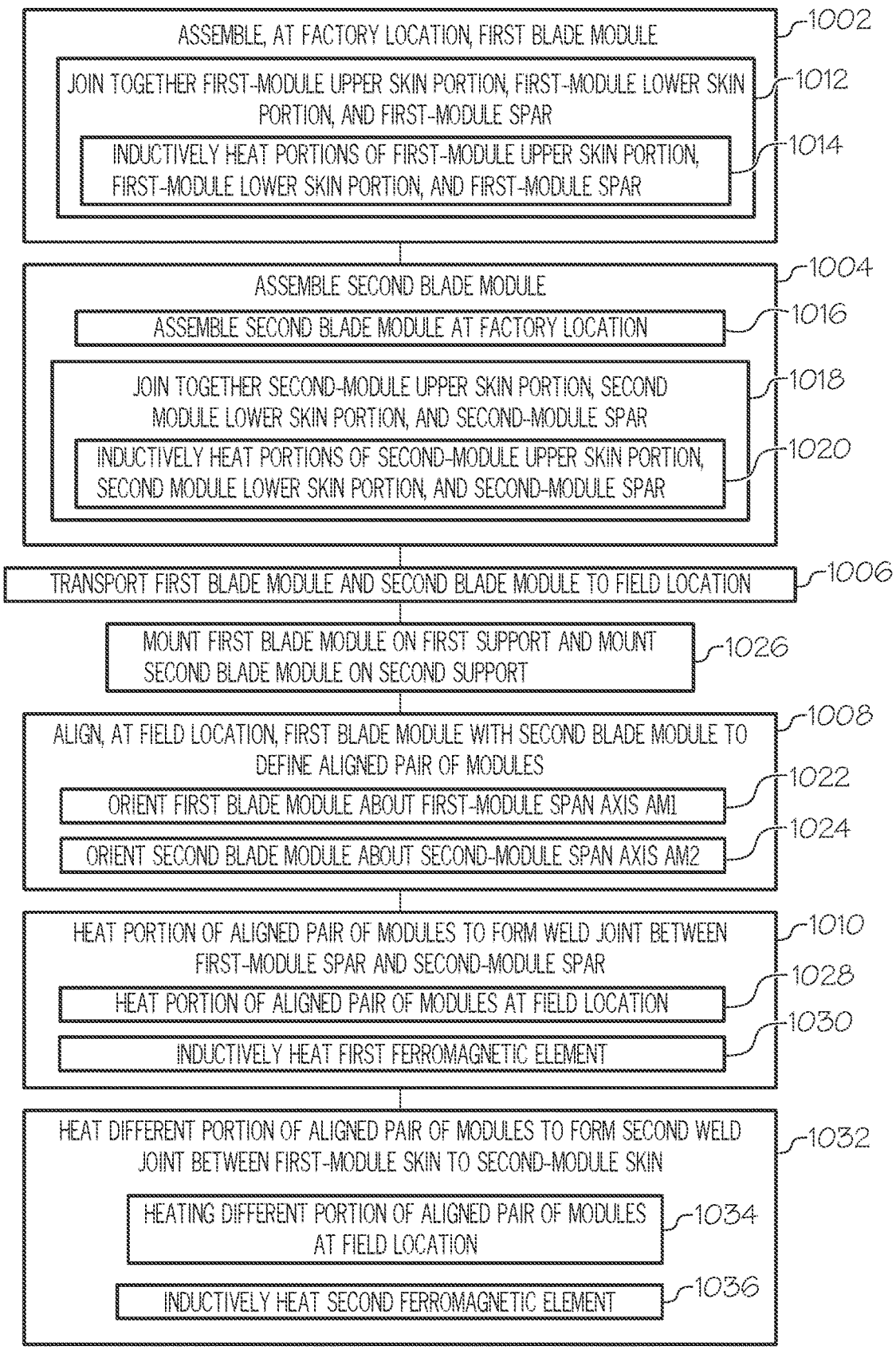

Having thus described one or more examples of the present disclosure in general terms, reference will now be made to the accompanying drawings, which are not necessarily drawn to scale, and wherein like reference characters designate the same or similar parts throughout the several views, and wherein:

FIG. 1, is a block diagram of a system for manufacturing a rotor blade, according to one or more examples of the present disclosure;

FIG. 2 is a schematic, elevation view of a rotor blade of FIG. 1, according to one or more examples of the present disclosure;

FIG. 3 is a schematic, end view of a first blade module of the rotor blade of FIG. 1, according to one or more examples of the present disclosure;

FIG. 4 is a schematic, end view of a second blade module of the rotor blade of FIG. 1, according to one or more examples of the present disclosure;

FIG. 5 is a schematic illustration of first tooling of the system of FIG. 1, depicting formation of a first-module upper skin portion of the first blade module, according to one or more examples of the present disclosure;

FIG. 6 is a schematic illustration of the first tooling of the system of FIG. 1, depicting formation of a first-module lower skin portion of the first blade module, according to one or more examples of the present disclosure;

FIG. 7 is a schematic illustration of the first tooling of the system of FIG. 1, depicting formation of the first blade module, according to one or more examples of the present disclosure;

FIG. 8 is a schematic illustration of a plurality of supports of the system of FIG. 1, according to one or more examples of the present disclosure;

FIG. 9 is a schematic, elevation view of the first blade module and the second blade module of the rotor blade of FIG. 1, according to one or more examples of the present disclosure;

FIG. 10 is a schematic, plan view of a spar welding assembly of the system of FIG. 1, according to one or more examples of the present disclosure;

FIG. 11 is a schematic, elevation view of a skin welding assembly of the system of FIG. 1, according to one or more examples of the present disclosure;

FIG. 12 is a schematic, sectional view of the skin welding assembly of the system of FIG. 1, according to one or more examples of the present disclosure;

FIG. 13 is a schematic, elevation view of the first blade module, the second blade module, and a third blade module of the rotor blade of FIG. 1, according to one or more examples of the present disclosure;

FIG. 14 is a schematic, elevation view of the first blade module, the second blade module, the third blade module, and a fourth blade module of the rotor blade of FIG. 1, according to one or more examples of the present disclosure; and FIG. 15, is a block diagram of a method of manufacturing a rotor blade utilizing the system of FIG. 1, according to one or more examples of the present disclosure.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIG. 15, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 15 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-14, system 100 for manufacturing rotor blade 112 is disclosed. System 100 comprises first tooling 170. First tooling 170 is positioned at factory location 114 and is configured to assemble first blade module 116. First blade module 116 comprises first-module skin 118 and first-module spar 120. Each of first-module skin 118 and first-module spar 120 comprises first thermoplastic polymer 122 and first reinforcement material 124. System 100 further comprises second tooling 172. Second tooling 172 is configured to assemble second blade module 126. Second blade module 126 comprises second-module skin 128 and second-module spar 130. Each of second-module skin 128 and second-module spar 130 comprises second thermoplastic polymer 132 and second reinforcement material 134. System 100 also comprises first support 160. First support 160 is positioned at field location 140 and is configured to receive first blade module 116. System 100 additionally comprises second support 162. Second support 162 is positioned at field location 140 and is configured to receive second blade module 126. System 100 further comprises spar welding assembly 174. Spar welding assembly 174 is positioned at field location 140 and is configured to join first-module spar 120 with second-module spar 130. System 100 also comprises skin welding assembly 176. Skin welding assembly 176 is positioned at field location 140 and is configured to join first-module skin 118 with second-module skin 128. System 100 additionally comprises transportation vehicle 178. Transportation vehicle 178 is configured to move first blade module 116 from factory location 114 to field location 140. The preceding subject matter of this paragraph characterizes example 1 of the present disclosure.

System 100 enables modularity in design of rotor blade 112. Modular design of rotor blade 112 enables plurality of blade modules 316 (FIG. 2) to be assembled at factory location 114 and to be connected together at field location 140 to form rotor blade 112. Accordingly, system 100 facilitates a reduction in manufacturing cycle time, an increase in production capacity, and a reduction in tooling costs. Further, modular design of rotor blade 112 enables plurality of blade modules 316 to be transported from factory location 114 to field location 140, rather than rotor blade 112 as a whole, which, in one or more examples, is extremely large when fully assembled. Accordingly, system 100 eases the challenges associated with transporting rotor blade 112 in a fully assembled condition.

As used herein, the term "module" refers to an independent and separate component that is used to construct a larger, more complex structure. For example, plurality of blade modules 316 refers to separate components that are used to construct rotor blade 112. In one or more examples, rotor blade 112 is a composite structure, made using system 100. In one or more examples, rotor blade 112 is a modular composite structure and each one of plurality of blade modules 316 is characterized by a particular construction, a particular function, a particular characteristic, a particular material composition, and/or particular location on rotor blade 112. In one or more examples, each one of plurality of blade modules 316 defines or forms a section or segment of rotor blade 112. As such, in one or more examples, different types of rotor blades are constructed using different combinations of blade modules. Additionally, improved properties of the thermoplastic material (e.g., first thermoplastic polymer 122 and second thermoplastic polymer 132) forming rotor blade 112 facilitate manufacture of rotor blade 112, having a lighter and more durable construction.

In one or more examples, more than one module of each type of module is manufactured using system 100. In one or more examples, one or more of plurality of blade modules 316 are the same (e.g., are of the same type, have the same construction, have the same geometry, have the same material composition, etc.). In one or more examples, one or more of plurality of blade modules 316 are different (e.g., are of different types, have different constructions, have different geometries, have different material composition, etc.).

In one or more examples, substantially similar ones of plurality of blade modules 316 (e.g., modules of the same type) are interchangeable with each other. In one or more examples, substantially similar ones of plurality of blade modules 316 (e.g., modules of the same type) are used to construct rotor blade 112. In one or more examples, different ones of plurality of blade modules 316 (e.g., modules of different types) are used to construct rotor blade 112.

As illustrated in FIG. 2, in one or more examples, rotor blade 112 includes, or is formed from, four blade modules 316, identified individually as first blade module 116, second blade module 126, third blade module 216, and fourth blade module 226. In one or more examples, rotor blade 112 includes, or is formed from, less than four or more than four blade modules.

In one or more examples, more than one first blade module 116, more than one second blade module 126, more than one third blade module 216, and/or more than one fourth blade module 226 are manufactured using system 100. As such, in one or more examples, a plurality of rotor blades is constructed, wherein each rotor blade 112 includes first blade module 116, second blade module 126, third blade module 216, and fourth blade module 226. Further, in one or more examples, any one of first blade module 116, second blade module 126, third blade module 216, or fourth blade module 226 is replaced with a different one of first blade module 116, second blade module 126, third blade module 216, or fourth blade module 226, such as during service or repair of rotor blade 112.

In one or more examples, first blade module 116 is made from composite material. In one or more examples, first-module skin 118 and first-module spar 120 are made from composite material.

As used herein, the term "composite material" has its ordinary meaning as known to those skilled in the art and refers to a material that is formed by combining two or more functional-component materials, such reinforcement material bound in a matrix material. In one or more examples, the matrix material takes the form of a thermoplastic polymer. In one or more examples, the reinforcement material takes the form of reinforcing fibers or other types of reinforcement materials. The reinforcing fibers and matrix material are arranged and cured to form a composite part. As such, in one or more examples, composite material includes a fiber-reinforced polymer.

As illustrated in FIG. 3, in one or more examples, first-module skin 118 forms an exterior surface, or shell, of first blade module 116. First-module spar 120 forms an internal support structure of first blade module 116. In one or more examples, first blade module 116 includes one or more additional internal support structures, such as one or more additional first-module spars (e.g., additional first-module spar 220), first-module ribs, and other parts.

In one or more examples, second blade module 126 is made from composite material. In one or more examples, second-module skin 128 and second-module spar 130 are made from composite material.

As illustrated in FIG. 4, in one or more examples, second-module skin 128 forms an exterior surface, or shell, of second blade module 126. Second-module spar 130 forms an internal support structure of second blade module 126. In one or more examples, second blade module 126 includes one or more additional internal support structures, such as one or more additional second-module spars (e.g., additional second-module spar 230), second-module ribs, and other parts.

In one or more examples, first thermoplastic polymer 122 (FIG. 1) of first-module skin 118 and first-module spar 120 includes, or takes the form of, at least one of polycarbonate, acetal copolymer polyoxymethylene, acetal homopolymer polyoxymethylene, acrylic, polyester, vinyl ester, nylon, polyethylene, polypropylene, polystyrene, polyvinyl chloride, polytetrafluoroethylene, and the like. In one or more examples, first thermoplastic polymer 122 also includes additives or other materials, such as plasticizers and the like.

In one or more examples, first reinforcement material 124 (FIG. 1) of first-module skin 118 and first-module spar 120 includes, or takes the form of, reinforcing fibers. In one or more examples, the reinforcing fibers of first reinforcement material 124 include at least one of glass fibers (fiberglass), carbon (graphite) fibers, aramid fibers, boron fibers, ceramic fibers, and the like. In one or more examples, the reinforcing fibers of first reinforcement material 124 are unidirectional or take the form of a woven or nonwoven cloth, fabric, or tape.

In one or more examples, second thermoplastic polymer 132 (FIG. 1) of second-module skin 128 and second-module spar 130 includes, or takes the form of, at least one of polycarbonate, acetal copolymer polyoxymethylene, acetal homopolymer polyoxymethylene, acrylic, polyester, vinyl ester, nylon, polyethylene, polypropylene, polystyrene, polyvinyl chloride, polytetrafluoroethylene, and the like. In one or more examples, second thermoplastic polymer 132 also includes additives or other materials, such as plasticizers and the like.

In one or more examples, second reinforcement material 134 (FIG. 1) of second-module skin 128 and second-module spar 130 includes, or takes the form of, reinforcing fibers. In one or more examples, the reinforcing fibers of second reinforcement material 134 include at least one of glass fibers (fiberglass), carbon (graphite) fibers, aramid fibers, boron fibers, ceramic fibers, and the like. In one or more examples, the reinforcing fibers of second reinforcement material 134 are unidirectional or take the form of a woven or nonwoven cloth, fabric, or tape.

In one or more examples, third blade module 216 (FIG. 2) includes third-module skin 218 (FIG. 13) and a third-module spar (not explicitly illustrated). In one or more examples, third blade module 216 is made from composite material and third-module skin 218 and the third-module spar are made from composite material. In one or more examples, each of third-module skin 218 and the third-module spar includes a third thermoplastic polymer and a third reinforcement material. Third-module skin 218 forms an exterior surface, or shell, of third blade module 216. The third-module spar forms an internal support structure of third blade module 216. In one or more examples, third blade module 216 includes one or more additional internal support structures, such as one or more additional third-module spars, third-module ribs, and other parts.

In one or more examples, fourth blade module 226 (FIG. 2) includes fourth-module skin 228 (FIG. 14) and a fourth-module spar (not explicitly illustrated). In one or more examples, fourth blade module 226 is made from composite material and fourth-module skin 228 and the fourth-module spar are made from composite material. In one or more examples, each of fourth-module skin 228 and the fourth-module spar includes a fourth thermoplastic polymer and a fourth reinforcement material. Fourth-module skin 228 forms an exterior surface, or shell, of fourth blade module 226. The fourth-module spar forms an internal support structure of fourth blade module 226. In one or more examples, fourth blade module 226 includes one or more additional internal support structures, such as one or more additional fourth-module spars, fourth-module ribs, and other parts.

In one or more examples, other ones of plurality of blade modules 316 have components and/or composite material similar to that of first blade module 116 and second blade module 126.

In one or more examples, factory location 114 (FIG. 1) refers to a first location where at least one of first blade module 116 and any other one of plurality of blade modules 316 (FIG. 2) are manufactured. First tooling 170 is located at factory location 114 for manufacturing first blade module 116 (e.g., number of first blade modules). As used herein, the phrase "number of" items means one or more of those items. In one or more examples, different ones of plurality of blade modules 316 are manufactured at different factory locations. As such, in one or more examples, system 100 includes a number of factory locations, each factory location 114 configured for manufacturing one or more of plurality of blade modules 316.

In one or more examples, field location 140 (FIG. 1) refers to a second location, which is different than the first location of factory location 114, where rotor blade 112 is constructed or assembled from first blade module 116 and second blade module 126 and, optionally, additional ones of plurality of blade modules 316 (FIG. 2). In other words, field location 140 is geographically separated from factory location 114. First support 160, second support 162, spar welding assembly 174, and skin welding assembly 176 are located at field location 140 for assembly of rotor blade 112. In one or more examples, field location 140 is, or is proximately located relative to, a delivery location of rotor blade 112, an installation location of rotor blade 112, a service location of rotor blade 112, or similar location.

In one or more examples, transportation vehicle 178 (FIG. 1) enables one or more of plurality of blade modules 316 (FIG. 2), such as first blade module 116, to be easily transported from factory location 114 to field location 140 for assembly of rotor blade 112. In one or more examples, transportation vehicle 178 includes a number of transportation vehicles, each transportation vehicle 178 being used for one portion of the trip from factory location 114 to field location 140. In one or more examples, transportation vehicle 178 includes at least one of a truck, a train, a ship, an aircraft, and the like, depending, for example, on the distance between factory location 114 and field location 140, the terrain between factory location 114 and field location 140, the number of blade modules being transported, and other factors.

In one or more examples, first tooling 170 (FIG. 1) includes any suitable tooling device capable of manufacturing and assembling first blade module 116 from first-module skin 118 and first-module spar 120.

In one or more examples, second tooling 172 (FIG. 1) includes any suitable tooling device capable of manufacturing and assembling second blade module 126 from second-module skin 128 and second-module spar 130.

In one or more examples, system 100 also includes third tooling (not illustrated), configured to assemble third blade module 216 (FIG. 2). The third tooling includes any suitable tooling device capable of manufacturing and assembling third blade module 216 from the third-module skin and the third-module spar. In one or more examples, the third tooling is positioned at factory location 114.

In one or more examples, system 100 also includes fourth tooling (not illustrated), configured to assemble fourth blade module 226 (FIG. 2). The fourth tooling includes any suitable tooling device capable of manufacturing and assembling fourth blade module 226 from the fourth-module skin and the fourth-module spar. In one or more examples, the fourth tooling is positioned at factory location 114.

In one or more examples, system 100 includes a number of tooling devices. The number of tooling devices is configured to manufacture and assemble plurality of blade modules 316 (FIG. 2). In one or more examples, the number of tooling devices is located at factory location 114.

As illustrated in FIG. 8, in one or more examples, system 100 includes plurality of supports 360. Each one of plurality of supports 360 is positioned, or located, at field location 140. Each one of plurality of supports 360 is configured to receive a corresponding, or associated, one of plurality of blade modules 316 and to support a corresponding one of plurality of blade modules 316 during assembly of rotor blade 112 (FIGS. 1 and 2).

In one or more examples, plurality of supports 360 includes first support 160, configured to receive and support first blade module 116, and second support 162, configured to receive and support second blade module 126. In one or more examples, plurality of supports 360 also includes third support 260, configured to receive and support third blade module 216, and fourth support 262, configured to receive and support fourth blade module 226.

In one or more examples, first support 160 includes any holding device capable of bracing first blade module 116 during assembly of rotor blade 112. In one or more examples, first support 160 is configured to selectively adjust a position (e.g., location and/or orientation) of first blade module 116 in three-dimensional space.

In one or more examples, second support 162 includes any holding device capable of bracing second blade module 126 during assembly of rotor blade 112. In one or more examples, second support 162 is configured to selectively adjust a position (e.g., location and/or orientation) of second blade module 126 in three-dimensional space.

In one or more examples, third support 260 includes any holding device capable of bracing third blade module 216 during assembly of rotor blade 112. In one or more examples, third support 260 is configured to selectively adjust a position (e.g., location and/or orientation) of third blade module 216 in three-dimensional space.

In one or more examples, fourth support 262 includes any holding device capable of bracing fourth blade module 226 during assembly of rotor blade 112. In one or more examples, fourth support 262 is configured to selectively adjust a position (e.g., location and/or orientation) of fourth blade module 226 in three-dimensional space.

As illustrated in FIGS. 8 and 9, in one or more examples, first blade module 116 defines first-module span axis $A_{M1}$. In one or more examples, second blade module 126 defines a second-module span axis $A_{M2}$. First support 160 and second support 162 enable alignment of first-module span axis $A_{M1}$ of first blade module 116 and second-module span axis $A_{M2}$ of second blade module 126 to define aligned pair of modules 142 for assembly of a portion of rotor blade 112 at field location 140.

As illustrated in FIG. 9, in one or more examples, first support 160 and second support 162 enable first-module span axis $A_{M1}$ of first blade module 116 and second-module span axis $A_{M2}$ of second blade module 126 to be aligned with, or otherwise define, rotor-blade span axis $A_S$ of rotor blade 112. In other words, when aligned, first-module span axis $A_{M1}$ of first blade module 116 and second-module span axis $A_{M2}$ of second blade module 126 define rotor-blade span axis $A_S$ of rotor blade 112.

As used herein, the terms "align," "aligning," "alignment," and similar terms, such as in reference to aligning axes or alignment of axes, means that the axes are coincident with each other. As an example, the phrase "aligning first-module span axis $A_{M1}$ with second-module span axis $A_{M2}$" refers to positioning first blade module 116 and second blade module 126 relative to each other so that first-module span axis $A_{M1}$ and second-module span axis $A_{M2}$ are coincident with each other. As another example, the phrase "aligned pair of modules" refers to an associated pair of modules of plurality of blade modules 316 that are positioned so that a span axis of one of the pair of modules is aligned with (e.g., coincident with) the span axis of the other one of the pair of modules.

As illustrated in FIGS. 8 and 13, in one or more examples, third blade module 216 defines third-module span axis $A_{M3}$. Second support 162 and third support 260 enable alignment of second-module span axis $A_{M2}$ of second blade module 126 and third-module span axis $A_{M3}$ of third blade module 216 to define another aligned pair of modules 142 for assembly of another portion of rotor blade 112 at field location 140.

As illustrated in FIG. 13, in one or more examples, first support 160, second support 162, and third support 260 enable first-module span axis $A_{M1}$ of first blade module 116, second-module span axis $A_{M2}$ of second blade module 126, and third-module span axis $A_{M3}$ of third blade module 216 to be aligned with, or otherwise define, rotor-blade span axis $A_S$ of rotor blade 112. In other words, when aligned, first-module span axis $A_{M1}$ of first blade module 116, second-module span axis $A_{M2}$ of second blade module 126, and third-module span axis $A_{M3}$ of third blade module 216 define rotor-blade span axis $A_S$ of rotor blade 112.

As illustrated in FIGS. 8 and 14, in one or more examples, fourth blade module 226 defines fourth-module span axis $A_{M4}$. Third support 260 and fourth support 262 enable alignment of third-module span axis $A_{M3}$ of third blade module 216 and fourth-module span axis $A_{M4}$ of fourth blade module 226 to define another aligned pair of modules 142 for assembly of another portion of rotor blade 112 at field location 140, such as to complete assembly of rotor blade 112, as illustrated in FIG. 14.

As illustrated in FIG. 14, in one or more examples, first support 160, second support 162, third support 260, and fourth support 262 enable first-module span axis $A_{M1}$ of first blade module 116, second-module span axis $A_{M2}$ of second blade module 126, third-module span axis $A_{M3}$ of third blade module 216, and fourth-module span axis $A_{M4}$ of fourth blade module 226 to be aligned with, or otherwise define, rotor-blade span axis $A_S$ of rotor blade 112. In other words, when aligned, first-module span axis $A_{M1}$ of first blade module 116, second-module span axis $A_{M2}$ of second blade module 126, third-module span axis $A_{M3}$ of third blade module 216, and fourth-module span axis $A_{M4}$ of fourth blade module 226 define rotor-blade span axis $A_S$ of rotor blade 112.

As illustrated in FIGS. 8, 9, 13, and 14, in one or more examples, one or more of plurality of supports 360, such as first support 160, second support 162, third support 260, and/or fourth support 262, includes alignment device 402 and collar 404.

In one or more examples, collar 404 is configured to hold a corresponding one of plurality of blade modules 316. In one or more examples, collar 404 includes a clamping mechanism and defines an opening that has a geometry that is complementary to a geometry of a corresponding one of plurality of blade modules 316 so that one of plurality of blade modules 316 is received by and is securely held by collar 404 of a corresponding one of plurality of supports 360.

In one or more examples, collar 404 is coupled to and is moveable relative to alignment device 402. In one or more examples, alignment device 402 is configured to selectively adjust a location (e.g., vertical and horizontal location) of collar 404 and an angular orientation of collar 404, which in turn, selectively adjusts a location (e.g., vertical and horizontal location) of a corresponding one of plurality of blade modules 316 and an angular orientation of a corresponding one of plurality of blade modules 316 to define aligned pair of modules 142 for assembly of a portion of rotor blade 112.

As illustrated in FIG. 9, in one or more examples, first blade module 116 is securely held by collar 404 of first support 160 and second blade module 126 is securely held by collar 404 of second support 162. In order to align first-module span axis $A_{M1}$ and second-module span axis $A_{M2}$ to define aligned pair of modules 142, at least one of a location and an angular orientation of first blade module 116 and second blade module 126 are selectively adjusted using first support 160 and second support 162, respectively.

As illustrated in FIG. 9, in one or more examples, a location of first blade module 116 along at least one of the X-axis, the Y-axis, and the Z-axis is selectively adjusted by selectively adjusting the location of collar 404 using alignment device 402 of first support 160, such as by moving collar 404 horizontally and/or vertically relative to alignment device 402. In one or more examples, an orientation of first blade module 116 about the X-axis is selectively adjusted by selectively adjusting the orientation of collar 404 using alignment device 402 of first support 160, such as by rotating collar 404 relative to alignment device 402.

As illustrated in FIG. 9, in one or more examples, a location of second blade module 126 along at least one of the X-axis, the Y-axis, and the Z-axis is selectively adjusted by selectively adjusting the location of collar 404 using alignment device 402 of second support 162, such as by moving collar 404 horizontally and/or vertically relative to alignment device 402. In one or more examples, an orientation of second blade module 126 about the X-axis is selectively adjusted by selectively adjusting the orientation of collar 404 using alignment device 402 of second support 162, such as by rotating collar 404 relative to alignment device 402.

In one or more examples, first blade module 116 and second blade module 126 are joined or are otherwise connected together following alignment of first-module span axis $A_{M1}$ and second-module span axis $A_{M2}$, as illustrated in FIG. 9. Joining of first blade module 116 and second blade module 126 is performed using spar welding assembly 174 and skin welding assembly 176 (FIG. 1).

As illustrated in FIGS. 1 and 10, in one or more examples, spar welding assembly 174 includes any suitable thermoplastic welding device capable to joining first-module spar 120 with second-module spar 130. Spar welding assembly 174 is configured to locally heat and melt first thermoplastic polymer 122 of first-module spar 120 and second thermoplastic polymer 132 of second-module spar 130 about spar-joining region 406 (FIG. 10) to fuse first-module spar 120 and second-module spar 130 together along a joining line. In one or more examples, spar welding assembly 174 includes, or takes the form of, at least one of a hot-gas welding device, an ultrasonic welding device, a spin welding device, a vibration welding device, a contact welding device, a laser welding device, a hot-plate welding device, and an induction welding device.

As illustrated in FIGS. 9 and 10, in one or more examples, upon alignment of first-module span axis $A_{M1}$ and second-module span axis $A_{M2}$, first blade module 116 and second blade module 126 are secured, or otherwise fixed, in an aligned position (e.g., as aligned pair of modules 142), for example, using first support 160 and second support 162, respectively (FIG. 9). When first blade module 116 and second blade module 126 are aligned and held in the aligned position, a joining end of first-module spar 120 and a joining end of second-module spar 130 are opposite to each other and abut each other, as illustrated in FIG. 10. A localized region, surrounding the joining end of first-module spar 120 and the joining end of second-module spar 130, defines spar-joining region 406.

As illustrated in FIG. 10, in one or more examples, spar welding assembly 174 is positioned proximate to (e.g., at or near) spar-joining region 406, such as about opposing and abutting ends of first-module spar 120 and second-module spar 130. In one or more examples, spar welding assembly 174 at least partially surrounds first-module spar 120 and second-module spar 130 at spar-joining region 406 (i.e., surrounds at least a portion of a perimeter of first-module spar 120 and second-module spar 130). In one or more examples, spar welding assembly 174 completely surrounds first-module spar 120 and second-module spar 130 at spar-joining region 406 (i.e., surrounds an entirety of the perimeter of first-module spar 120 and second-module spar 130).

As illustrated in FIG. 10, in one or more examples, access opening 432 is formed in first blade module 116 and/or second blade module 126 to enable spar welding assembly 174 to access first-module spar 120 and second-module spar 130 at spar-joining region 406. In one or more examples, a portion of first-module skin 118 and/or a portion of second-module skin 128 are removed (e.g., cut away) to form access opening 432 and to provide access to first-module spar 120 and second-module spar 130 at spar-joining region 406 by spar welding assembly 174.

In one or more examples, after joining first-module spar 120 and second-module spar 130 using spar welding assembly 174, a composite charge (e.g., formed of a number of plies or sheets of composite material) is applied and joined to first-module skin 118 and second-module skin 128 to cover access opening 432 and enclose first blade module 116 and/or second blade module 126. In one or more examples, the composite charge is joined to first-module skin 118 and second-module skin 128 using skin welding assembly 176.

In one or more examples, any additional internal support structures of first blade module 116 and second blade module 126, such as one or more additional first-module spars (e.g., additional first-module spar 220), one or more additional second-module spars (e.g., additional second-module spar 230), first-module ribs, second-module ribs, and other parts are also joined together using spar welding assembly 174.

As illustrated in FIGS. 1, 11, and 12, in one or more examples, skin welding assembly 176 includes any suitable thermoplastic welding device capable to joining first-module skin 118 with second-module skin 128. Skin welding assembly 176 is configured to locally heat and melt first thermoplastic polymer 122 of first-module skin 118 and second thermoplastic polymer 132 of second-module skin 128 about skin-joining region 408 (FIG. 11) to fuse first-module skin 118 and second-module skin 128 together along a joining line. In one or more examples, skin welding assembly 176 includes, or takes the form of, at least one of a hot-gas welding device, an ultrasonic welding device, a spin welding device, a vibration welding device, a contact welding device, a laser welding device, a hot-plate welding device, and an induction welding device.

As illustrated in FIG. 11, in one or more examples, upon alignment of first-module span axis $A_{M1}$ and second-module span axis $A_{M2}$, first blade module 116 and second blade module 126 are secured, or otherwise fixed, in the aligned position (e.g., as aligned pair of modules 142), for example, using first support 160 and second support 162, respectively. When first blade module 116 and second blade module 126 are aligned and held in the aligned position, a joining end of first-module skin 118 and a joining end of second-module skin 128 are opposite to each other and abut each other, as illustrated in FIG. 11. A localized region surrounding the joining end of first-module skin 118 and the joining end of second-module skin 128 defines skin-joining region 408.

As illustrated in FIGS. 11 and 12, in one or more examples, skin welding assembly 176 is positioned proximate to (e.g., at or near) skin-joining region 408, such as about opposing and abutting ends of first-module skin 118 and second-module skin 128. In one or more examples, skin welding assembly 176 at least partially surrounds first-module skin 118 and second-module skin 128 at skin-joining region 408 (i.e., surrounds at least a portion of a perimeter of first-module skin 118 and second-module skin 128). In one or more examples, skin welding assembly 176 completely surrounds first-module skin 118 and second-module skin 128 at skin-joining region 408 (i.e., surrounds an entirety of the perimeter of first-module skin 118 and second-module skin 128).

In one or more examples, first blade module 116 and second blade module 126 are aligned and joined together using spar welding assembly 174 and skin welding assembly 176, as illustrated in 9-12. Third blade module 216 is then aligned with and joined to second blade module 126 using spar welding assembly 174 and skin welding assembly 176, as illustrated in FIG. 13. Fourth blade module 226 is then aligned with and joined to third blade module 216 using spar welding assembly 174 and skin welding assembly 176, as illustrated in FIG. 14. Alternatively, in one or more examples, first blade module 116, second blade module 126, third blade module 216, and fourth blade module 226 are aligned with each other, as illustrated in FIG. 14. After alignment of plurality of blade modules 316, first blade module 116 and second blade module 126 are joined together, second blade module 126 and third blade module 216 are joined together, and third blade module 216 and fourth blade module 226 are joined together using spar welding assembly 174 and skin welding assembly 176. This joining process is performed concurrently or sequentially, in one or more examples.

As illustrated in FIG. 13, in one or more examples, second blade module 126 is securely held by collar 404 of second support 162 and third blade module 216 is securely held by collar 404 of third support 260. In order to align second-module span axis $A_{M2}$ and third-module span axis $A_{M2}$ to define aligned pair of modules 142, at least one of a location and an angular orientation of second blade module 126 and third blade module 216 are selectively adjusted using second support 162 and third support 260, respectively.

It should be appreciated that, when first blade module 116 and second blade module 126 are joined before joining third blade module 216 with second blade module 126, selective adjustment of the location and/or orientation of second blade module 126 corresponds to co-adjustment of the location and/or orientation of first blade module 116 with second blade module 126.

As illustrated in FIG. 13, in one or more examples, a location of third blade module 216 along at least one of the X-axis, the Y-axis, and the Z-axis is selectively adjusted by selectively adjusting the location of collar 404 using alignment device 402 of third support 260, such as by moving collar 404 horizontally and/or vertically relative to alignment device 402. In one or more examples, an orientation of third blade module 216 about the X-axis is selectively adjusted by selectively adjusting the orientation of collar 404 using alignment device 402 of third support 260, such as by rotating collar 404 relative to alignment device 402.

In one or more examples, second blade module 126 and third blade module 216 are joined or are otherwise connected together following alignment of second-module span axis $A_{M2}$ and third-module span axis $A_{M3}$, as illustrated in FIG. 13. Joining of second blade module 126 and third blade module 216 is performed using spar welding assembly 174 and skin welding assembly 176 (FIG. 1).

Upon alignment of second-module span axis $A_{M2}$ and third-module span axis $A_{M3}$, second blade module 126 and third blade module 216 are secured, or otherwise fixed, in an aligned position (e.g., as aligned pair of modules 142), for example, using second support 162 and third support 260, respectively (FIG. 13). When second blade module 126 and third blade module 216 are aligned and held in the aligned position, a joining end of second-module spar 130 and a joining end of a third-module spar (not illustrated) are opposite to each other and abut each other. A localized region surrounding the joining end of second-module spar 130 and the joining end of the second-module spar defines spar-joining region 406 (FIG. 10).

Although FIG. 10 illustrates spar welding assembly 174 joining first-module spar 120 of first blade module 116 with second-module spar 130 of second blade module 126, the configuration, depicted in FIG. 10, and the operations, described above, for joining first-module spar 120 of first blade module 116 with second-module spar 130 of second blade module 126 are applicable in substantially the same manner for joining second-module spar 130 of second blade module 126 with the third-module spar of third blade module 216.

In one or more examples, upon alignment of second-module span axis $A_{M2}$ and third-module span axis $A_{M3}$, second blade module 126 and third blade module 216 are secured, or otherwise fixed, in the aligned position (e.g., as aligned pair of modules 142), for example, using second support 162 and third support 260, respectively. When second blade module 126 and third blade module 216 are aligned and held in the aligned position, a joining end of second-module skin 128 and a joining end of third-module skin 218 are opposite to each other and abut each other, as illustrated in FIG. 13. A localized region surrounding the joining end of second-module skin 128 and the joining end of third-module skin 218 defines skin-joining region 408.

Although FIGS. 11 and 12 illustrates skin welding assembly 176 joining first-module skin 118 of first blade module 116 with second-module skin 128 of second blade module 126, the configurations, depicted in FIGS. 11 and 12, and the operations, described above, for joining first-module skin 118 of first blade module 116 with second-module skin 128 of second blade module 126 are applicable in substantially the same manner for joining second-module skin 128 of second blade module 126 with third-module skin 218 of third blade module 216.

As illustrated in FIG. 14, in one or more examples, third blade module 216 is securely held by collar 404 of third support 260 and fourth blade module 226 is securely held by collar 404 of fourth support 262. In order to align third-module span axis $A_{M3}$ and fourth-module span axis $A_{M4}$ to define aligned pair of modules 142, at least one of a location and an angular orientation of third blade module 216 and fourth blade module 226 are selectively adjusted using third support 260 and fourth support 262, respectively.

It should be appreciated that, when first blade module 116, second blade module 126, and third blade module 216 are joined before joining fourth blade module 226 with third blade module 216, selective adjustment of the location and/or orientation of third blade module 216 corresponds to co-adjustment of the location and/or orientation of first blade module 116 and second blade module 126 with third blade module 216.

As illustrated in FIG. 14, in one or more examples, a location of fourth blade module 226 along at least one of the X-axis, the Y-axis, and the Z-axis is selectively adjusted by selectively adjusting the location of collar 404 using alignment device 402 of fourth support 262, such as by moving collar 404 horizontally and/or vertically relative to alignment device 402. In one or more examples, an orientation of fourth blade module 226 about the X-axis is selectively adjusted by selectively adjusting the orientation of collar 404 using alignment device 402 of fourth support 262, such as by rotating collar 404 relative to alignment device 402.

In one or more examples, third blade module 216 and fourth blade module 226 are joined or are otherwise connected together following alignment of third-module span axis $A_{M3}$ and fourth-module span axis $A_{M4}$, as illustrated in FIG. 14. Joining of third blade module 216 and fourth blade module 226 is performed using spar welding assembly 174 and skin welding assembly 176 (FIG. 1).

Upon alignment of third-module span axis $A_{M3}$ and fourth-module span axis $A_{M4}$, third blade module 216 and fourth blade module 226 are secured, or otherwise fixed, in an aligned position (e.g., as aligned pair of modules 142), for example, using third support 260 and fourth support 262, respectively (FIG. 14). When third blade module 216 and fourth blade module 226 are aligned and held in the aligned position, a joining end of the third-module spar (not illustrated) and a joining end of a fourth-module spar (not illustrated) are opposite to each other and abut each other. A localized region surrounding the joining end of the third-module spar and the joining end of the fourth-module spar defines spar-joining region 406 (FIG. 10).

Although FIG. 10 illustrates spar welding assembly 174 joining first-module spar 120 of first blade module 116 with second-module spar 130 of second blade module 126, the configuration, depicted in FIG. 10, and the operations, described above, for joining first-module spar 120 of first blade module 116 with second-module spar 130 of second blade module 126 are applicable in substantially the same manner for joining the third-module spar of third blade module 216 with the fourth-module spar of fourth blade module 226.

In one or more examples, upon alignment of third-module span axis $A_{M3}$ and fourth-module span axis $A_{M4}$, third blade module 216 and fourth blade module 226 are secured, or otherwise fixed, in the aligned position (e.g., as aligned pair of modules 142), for example, using third support 260 and fourth support 262, respectively. When third blade module 216 and fourth blade module 226 are aligned and held in the aligned position, a joining end of third-module skin 218 and a joining end of fourth-module skin 228 are opposite to each other and abut each other, as illustrated in FIG. 14. A localized region, surrounding the joining end of third-module skin 218 and the joining end of fourth-module skin 228 defines skin-joining region 408.

Although FIGS. 11 and 12 illustrates skin welding assembly 176 joining first-module skin 118 of first blade module 116 with second-module skin 128 of second blade module 126, the configurations, depicted in FIGS. 11 and 12, and the operations, described above, for joining first-module skin 118 of first blade module 116 with second-module skin 128 of second blade module 126 are applicable in substantially the same manner for joining third-module skin 218 of third blade module 216 with fourth-module skin 228 of fourth blade module 226.

Referring generally to FIG. 1, second tooling 172 is at factory location 114. The preceding subject matter of this paragraph characterizes example 2 of the present disclosure, wherein example 2 also includes the subject matter according to example 1, above.

Second tooling 172 being positioned, or located, at factory location 114 enables first blade module 116 and second blade module 126 to be manufactured and assembled at the same location, which facilitates a reduction in manufacturing cycle time, an increase in production capacity, and a reduction in tooling costs. Second tooling 172 being positioned, or located, at factory location 114 enables first blade module 116 and second blade module 126 to be transported together from factory location 114 to field location 140.

Referring generally to FIG. 1, transportation vehicle 178 is configured to move both first blade module 116 and second blade module 126 from factory location 114 to field location 140. The preceding subject matter of this paragraph characterizes example 3 of the present disclosure, wherein example 3 also includes the subject matter according to example 2, above.

First blade module 116 and second blade module 126 being transported together from factory location 114 to field location 140 via transportation vehicle 178 facilitates a reduction in transportation costs and delivery time.

Referring generally to FIG. 1 and particularly to, e.g., FIGS. 3 and 5, first tooling 170 comprises first matched pair of tools 169, configured to form first-module upper skin portion 150 of first-module skin 118. The preceding subject matter of this paragraph characterizes example 4 of the present disclosure, wherein example 4 also includes the subject matter according to any one of examples 1 to 3, above.

First matched pair of tools 169 enables repeatable formation of first-module upper skin portion 150 of first-module skin 118 of first blade module 116 using first tooling 170.

In one or more examples, first tooling 170 includes, or takes the form of, any one of various suitable types of composite shaping and forming machines or equipment. In one or more examples, first tooling 170 if configured to shape first-module upper skin portion 150 for formation of first-module skin 118 of first blade module 116.

In one or more examples, each one of first matched pair of tools 169, identified individually as first tool 169A and second tool 169B in FIG. 5, is formed of a material, having desirable properties. In one or more examples, desirable properties for each one of first matched pair of tools 169 (e.g., first tool 169A and second tool 169B) include at least one of cost of material, cost of manufacture, time of manufacture, heat properties of the material, non-reactivity, rigidity, or other material properties. In one or more examples, at least one of first tool 169A and second tool 169B is manufactured from materials, capable of being machined.

As illustrated in FIG. 5, in one or more examples, first-module upper skin portion 150 of first-module skin 118 is formed by placing, heating, and compressing a number of plies or sheets of fiber-reinforced polymer (a composite charge of first thermoplastic polymer 122 and first reinforcement material 124) between first matched pair of tools 169. In one or more examples, first tool 169A takes the form of a mold or die having geometry complementary to and configured to form an outer-mold-line of first-module upper skin portion 150. In one or more examples, second tool 169B takes the form of a mold or die having geometry complementary to and configured to form an inner-mold-line of first-module upper skin portion 150.

In one or more examples, at least one of first matched pair of tools 169 (e.g., first tool 169A and second tool 169B) are heated during shaping of first-module upper skin portion 150. In one or more examples, first tool 169A and second tool 169B are heated by any one of various techniques.

In one or more examples, first tooling 170 includes heating system 418. Heating system 418 is configured to heat at least one of first matched pair of tools 169 (e.g., first tool 169A and/or second tool 169B) and/or first-module upper skin portion 150 when shaping and forming first-module upper skin portion 150. In one or more examples, heating system 418 includes an induction-heating system, used to heat at least one of first matched pair of tools 169 (e.g., first tool 169A and/or second tool 169B). In one or more examples, the induction-heating system includes a magnetic-field generator and magnetically permeable material.

As illustrated in FIG. 5, in one or more examples, the magnetic-field generator includes plurality of conformable induction coils 416. In one or more examples, plurality of conformable induction coils 416 are embedded in at least one of first tool 169A and second tool 169B proximate to a forming surface of first tool 169A and second tool 169B, respectively. In one or more examples, plurality of conformable induction coils 416 are embedded in an elastomeric material (not explicitly illustrated). In one or more examples, the elastomeric material takes the form of a number of elastomeric sheets (not explicitly illustrated) that are coupled to the forming surface of at least one of first tool 169A and second tool 169B.

In one or more examples, plurality of conformable induction coils 416 is configured to generate a magnetic field under the control of a controller. The controller is a hardware device and controls the application of current to plurality of conformable induction coils 416 to control the generation of the magnetic field. In one or more examples, plurality of conformable induction coils 416 is formed of thin gauge wire. In one or more examples, plurality of conformable induction coils 416 is a plurality of lengths of Litz wire. Litz wire is a graded fine copper wire.

In one or more examples, plurality of conformable induction coils 416 extends across an entirety of first-module upper skin portion 150. In one or more examples, plurality of conformable induction coils 416 extends less than the entirety of first-module upper skin portion 150. In one or more examples, plurality of conformable induction coils 416 only extend such that a magnetic field is generated in a desired area.

In one or more examples, the magnetic field interacts with the magnetically permeable material to cause the magnetically permeable material to generate heat. The magnetically permeable material is configured to generate heat when exposed to the magnetic field. In particular, the magnetic field is an electromagnetic-flux field that interacts with the magnetically permeable material. In one or more examples, plurality of conformable induction coils 416 are positioned such that plurality of conformable induction coils 416 are directed orthogonal to the magnetically permeable material in the form of wires. In one or more examples, this positioning is selected to generate the magnetic field that desirably interacts with the magnetically permeable material.

In one or more examples, the magnetically permeable material includes one or more of various types of materials. In one or more examples, the magnetically permeable material is selected from at least one of a cobalt alloy, an iron alloy, a nickel and iron alloy, an iron and silicon alloy, an amorphous magnetic alloy, a crystalline magnetic alloy, or some other suitable material.

In one or more examples, the magnetically permeable material takes the form of a smart susceptor. A smart susceptor is a select type of susceptor that is constructed of a material, or materials, that generate heat efficiently until reaching a threshold, or Curie, temperature. As portions of the smart susceptor reach the Curie temperature, the magnetic permeability of those portions drops precipitously. The drop in magnetic permeability has two effects, it limits the generation of heat by those portions at the Curie temperature, and it shifts the magnetic flux to the lower temperature portions causing those portions below the Curie temperature to more quickly heat up to the Curie temperature.

In one or more examples, the magnetically permeable material has various forms or shapes. In one or more examples, the magnetically permeable material has a shape, selected from at least one of a wire, a strip, a plate, a sheet, or some other suitable shape. The particular shape selected may vary depending on the particular implementation.

In one or more examples, the magnetically permeable material is embedded in at least one of first tool 169A and/or second tool 169B proximate to the forming surface of each one of first tool 169A and second tool 169B, respectively. In one or more examples, the magnetically permeable material is coupled to the forming surface of at least one of first tool 169A and second tool 169B. In one or more examples, the magnetically permeable material is located between at least one of first matched pair of tools 169 (e.g., first tool 169A and/or second tool 169B) and first-module upper skin portion 150. In one or more examples, the magnetically permeable material is configured to generate heat to at least soften first thermoplastic polymer 122 of first-module upper skin portion 150 for shaping.

As illustrated in FIG. 5, in one or more examples, first tooling 170 includes support structure 171. Support structure 171 is configured to hold and selectively move matched pair of tools 169 during formation of first-module upper skin portion 150 of first-module skin 118. In one or more examples, support structure 171 includes first strongback 410 and second strongback 412. First tool 169A is coupled to and is supported by first strongback 410. Second tool 169B is coupled to and is supported by second strongback 412. First strongback 410 and second strongback 412 are moveable relative to each other to bring first matched pair of tools 169 together when forming first-module upper skin portion 150. In one or more examples, support structure 171 also includes drive mechanism 414. Drive mechanism 414 is operatively coupled with first strongback 410 and second strongback 412 to move at least one of first strongback 410 and second strongback 412 relative to each other and, thus, move at least one of first tool 169A and second tool 169B relative to each other. In one or more examples, drive mechanism 414 is a mechanical screw assembly. In one or more examples, drive mechanism 414 is a hydraulic press assembly.

In one or more examples, first-module upper skin portion 150 is covered by a vacuum bag (not illustrated) that sealed to at least one of first matched pair of tools 169 to form a vacuum chamber.

Referring generally to FIG. 1 and particularly to, e.g., FIGS. 3 and 6, first tooling 170 further comprises second matched pair of tools 173, configured to form first-module lower skin portion 152 of first-module skin 118. The preceding subject matter of this paragraph characterizes example 5 of the present disclosure, wherein example 5 also includes the subject matter according to example 4, above.

Second matched pair of tools 173 enables repeatable formation of first-module lower skin portion 152 of first-module skin 118 of first blade module 116 using first tooling 170.

In one or more examples, first tooling 170 if configured to shape first-module lower skin portion 152 for formation of first-module skin 118 of first blade module 116.

In one or more examples, each one of second matched pair of tools 173, identified individually as third tool 173A and fourth tool 173B in FIG. 6, is formed of a material having desirable properties. In one or more examples, desirable properties for each one of second matched pair of tools 173 (e.g., third tool 173A and fourth tool 173B) include at least one of cost of material, cost of manufacture, time of manufacture, heat properties of the material, non-reactivity, rigidity, or other material properties. In one or more examples, at least one of third tool 173A and fourth tool 173B is manufactured from materials, capable of being machined.

As illustrated in FIG. 6, in one or more examples, first-module lower skin portion 152 of first-module skin 118 is formed by placing, heating, and compressing a number of plies or sheets of fiber-reinforced polymer (a composite charge of first thermoplastic polymer 122 and first reinforcement material 124) between second matched pair of tools 173. In one or more examples, third tool 173A takes the form of a mold or die, having geometry complementary to and configured to form an inner-mold-line of first-module lower skin portion 152. In one or more examples, fourth tool 173B takes the form of a mold or die having geometry complementary to and configured to form an outer-mold-line of first-module lower skin portion 152.

In one or more examples, at least one of second matched pair of tools 173 (e.g., third tool 173A and fourth tool 173B) are heated during shaping of first-module lower skin portion 152. In one or more examples, third tool 173A and fourth tool 173B are heated by any one of various techniques.

In one or more examples, heating system 418 is configured to heat at least one of second matched pair of tools 173 (e.g., third tool 173A and/or fourth tool 173B) and/or first-module lower skin portion 152 when shaping and forming first-module lower skin portion 152. In one or more examples, heating system 418 includes the induction-heating system used to heat at least one of second matched pair of tools 173 (e.g., third tool 173A and/or fourth tool 173B). In one or more examples, the induction-heating system includes the magnetic-field generator and the magnetically permeable material.

As illustrated in FIG. 6, in one or more examples, the magnetic-field generator includes plurality of conformable induction coils 416. In one or more examples, plurality of conformable induction coils 416 are embedded in at least one of third tool 173A and fourth tool 173B proximate to a forming surface of third tool 173A and fourth tool 173B, respectively. In one or more examples, plurality of conformable induction coils 416 are embedded in the elastomeric material (not explicitly illustrated). In one or more examples, the elastomeric material takes the form of the number of elastomeric sheets (not explicitly illustrated) that are coupled to the forming surface of at least one of third tool 173A and fourth tool 173B.

In one or more examples, plurality of conformable induction coils 416 extends across an entirety of first-module lower skin portion 152. In one or more examples, plurality of conformable induction coils 416 extends less than the entirety of first-module lower skin portion 152. In one or more examples, plurality of conformable induction coils 416 only extend such that a magnetic field is generated in a desired area.

In one or more examples, the magnetically permeable material is embedded in at least one of third tool 173A and/or fourth tool 173B proximate to the forming surface of each one of third tool 173A and fourth tool 173B, respectively. In one or more examples, the magnetically permeable material coupled to the forming surface of at least one of third tool 173A and fourth tool 173B. In one or more examples, the magnetically permeable material is located between at least one of second matched pair of tools 173 (e.g., third tool 173A and/or fourth tool 173B) and first-module lower skin portion 152. In one or more examples, the magnetically permeable material is configured to generate heat to at least soften first thermoplastic polymer 122 of first-module lower skin portion 152 for shaping.

As illustrated in FIG. 6, in one or more examples, third tool 173A is coupled to and is supported by first strongback 410 and fourth tool 173B is coupled to and is supported by second strongback 412. First strongback 410 and second strongback 412 are moveable relative to each other to bring second matched pair of tools 173 together when forming first-module lower skin portion 152. Drive mechanism 414 is operatively coupled with first strongback 410 and second strongback 412 to move at least one of first strongback 410 and second strongback 412 relative to each other and, thus, move at least one of third tool 173A and fourth tool 173B relative to each other.

In one or more examples, first-module lower portion 152 is covered by a vacuum bag (not illustrated) that sealed to at least one of second matched pair of tools 173 to form a vacuum chamber.

Referring generally to FIG. 1 and particularly to, e.g., FIGS. 3 and 7, tool of first matched pair of tools 169 and tool of second matched pair of tools 173 cooperate to form first blade module 116. The preceding subject matter of this paragraph characterizes example 6 of the present disclosure, wherein example 6 also includes the subject matter according to example 5, above.

Cooperative use of tool of first matched pair of tools 169 and tool of second matched pair of tools 173 enables repeatable formation of first blade module 116 from first-module upper skin portion 150, first-module lower skin portion 152, and first-module spar 120 using first tooling 170. Accordingly, tool of first matched pair of tools 169, used to form first-module upper skin portion 150, and tool of second matched pair of tools 173, used to form first-module lower skin portion 152 are reusable for forming first blade module 116.

As illustrated in FIG. 7, in one or more examples, first tool 169A of first matched pair of tools 169 and fourth tool 173B of second matched pair of tools 173 are used to form first blade module 116. First tool 169A has geometry complementary to first-module upper skin portion 150 and, thus, geometry complementary and configured to form a portion (e.g., an upper portion) of first blade module 116. Fourth tool 173B has geometry complementary to first-module lower skin portion 152 and, thus, complementary and configured to form another portion (e.g., a lower portion) of first blade module 116.

As illustrated in FIG. 7, in one or more examples, first blade module 116 is placed or otherwise positioned between tool of first matched pair of tools 169 (e.g., first tool 169A) and tool of second matched pair of tools 173 (e.g., fourth tool 173B). First blade module 116 is formed by placing, heating, and compressing first-module lower skin portion 152, first-module spar 120 (and any additional internal support structures, such as additional first-module spar 220), and first-module upper skin portion 150 between first tool 169A and fourth tool 173B to consolidate and/or at least partially cure first blade module 116.

In one or more examples, at least one of tool of first matched pair of tools 169 (e.g., first tool 169A) and tool of second matched pair of tools 173 (e.g., fourth tool 173B) are heated during forming of first blade module 116. In one or more examples, first tool 169A and fourth tool 173B are heated by any one of various techniques.

In one or more examples, heating system 418 is configured to heat at least one of tool of first matched pair of tools 169 (e.g., first tool 169A) and tool of second matched pair of tools 173 (e.g., fourth tool 173B) and/or first blade module 116 when forming first blade module 116. In one or more examples, heating system 418 includes the induction-heating system used to heat at least one of first tool 169A and/or fourth tool 173B and/or first-module skin 118 (e.g., first-module upper skin portion 150 and first-module lower skin portion 152) and first-module spar 120, such at joint locations. In one or more examples, the induction-heating system includes the magnetic-field generator and the magnetically permeable material.

As illustrated in FIG. 7, in one or more examples, the magnetic-field generator includes plurality of conformable induction coils 416. In one or more examples, plurality of conformable induction coils 416 are embedded in at least one of fourth tool 173B and fourth tool 173B proximate to a forming surface of first tool 169A and fourth tool 173B, respectively. In one or more examples, plurality of conformable induction coils 416 are embedded in the elastomeric material. In one or more examples, the elastomeric material takes the form of the number of elastomeric sheets that are coupled to the forming surface of at least one of first tool 169A and fourth tool 173B.

In one or more examples, plurality of conformable induction coils 416 extends across an entirety of first blade module 116. In one or more examples, plurality of conformable induction coils 416 extends less than the entirety of first blade module 116. In one or more examples, plurality of conformable induction coils 416 only extend such that a magnetic field is generated in a desired area.

In one or more examples, the magnetically permeable material is embedded in at least one of first tool 169A and/or fourth tool 173B proximate to the forming surface of each one of first tool 169A and fourth tool 173B, respectively. In one or more examples, the magnetically permeable material coupled to the forming surface of at least one of first tool 169A and fourth tool 173B. In one or more examples, the magnetically permeable material is located between at least one of first tool 169A and/or fourth tool 173B and first blade module 116. In one or more examples, the magnetically permeable material is configured to generate heat to at least soften first thermoplastic polymer 122 of first-module lower skin portion 152, first-module upper skin portion 150, and first-module spar 120 for consolidation.

As illustrated in FIG. 7, in one or more examples, first tool 169A is coupled to and is supported by first strongback 410 and fourth tool 173B is coupled to and is supported by second strongback 412. First strongback 410 and second strongback 412 are moveable relative to each other to bring first tool 169A and fourth tool 173B together when forming first blade module 116. Drive mechanism 414 is operatively coupled with first strongback 410 and second strongback 412 to move at least one of first strongback 410 and second strongback 412 relative to each other and, thus, move at least one of first tool 169A and fourth tool 173B relative to each other.

In one or more examples, first blade module 116 is covered by a vacuum bag (not illustrated) that sealed to at least one of tool of first matched pair of tools 169 (e.g., first tool 169A) and tool of second matched pair of tools 173 (e.g., fourth tool 173B) to form a vacuum chamber.

In one or more examples, seal tape (not illustrated) is applied to any joint between first-module lower skin portion 152, first-module spar 120 (and any additional internal support structures, such as additional first-module spar 220), and first-module upper skin portion 150 to enable internal pressurization of first blade module 116 during formation.

In one or more examples, second tooling 172 is configured, operates, and performs functions related to formation of second-module upper skin portion 154, second-module lower skin portion 156, and second blade module 126 that are substantially equivalent to the configuration, operation, and functions performed by that of first tooling 170 related to formation of first-module upper skin portion 150, first-module lower skin portion 152, and first blade module 116 described above and illustrated in FIGS. 5-7. Accordingly, although not explicitly illustrated, the components and configurations of second tooling 172 and the operations of second tooling 172 for forming second-module upper skin portion 154, second-module lower skin portion 156, and second blade module 126 are applicable in substantially the same manner as the components and configurations of first tooling 170 depicted in FIGS. 5-7 and the operations of first tooling 170 described above for forming first-module upper skin portion 150, first-module lower skin portion 152, and first blade module 116.

In one or more examples, second tooling 172 (FIG. 1) includes a first matched pair of tools (not explicitly illustrated), configured to form second-module upper skin portion 154 of second-module skin 128 (FIG. 4). In one or more examples, second tooling 172 includes a second matched pair of tools (not explicitly illustrated), configured to form second-module lower skin portion 156 of second-module skin 128 (FIG. 4). In one or more examples, a tool of the first matched pair of tools and a tool of the second matched pair of tools of second tooling 172 cooperate to form second blade module 126. In one or more examples, second tooling 172 includes a heating system that is substantially the same as heating system 418 (FIGS. 5-7). In one or more examples, the heating system of second tooling 172 includes an induction-heating system used to heat at least one of the first matched pair of tools and the second matched pair of tools of second tooling. In one or more examples, the induction-heating system includes a magnetic-field generator, such as a plurality of conformable induction coils, and magnetically permeable material.

In one or more examples, system 100 includes a plurality of tooling, configured to assemble plurality of blade modules 316. For example, the plurality of tooling includes third tooling, configured to assemble third blade module 216, fourth tooling, configured to assemble fourth blade module 226, and any number of other tooling configured to assemble any number of other blade modules. Although not explicitly illustrated, the components and configurations of one or more of the plurality of tooling and the operations of one or more of the plurality of tooling for forming one or more other-upper skin portions, one or more other-module lower skin portions, and one or more other blade modules of plurality of blade modules 316 are applicable in substantially the same manner as the components and configurations of first tooling 170 depicted in FIGS. 5-7 and the operations of first tooling 170 described above for forming first-module upper skin portion 150, first-module lower skin portion 152, and first blade module 116.

Referring generally to FIG. 1, field location 140 is at least 1 kilometer away from factory location 114. The preceding subject matter of this paragraph characterizes example 7 of the present disclosure, wherein example 7 also includes the subject matter according to any one of examples 1 to 6, above.

Referring generally to FIG. 1, field location 140 is at least 100 kilometers away from factory location 114. The preceding subject matter of this paragraph characterizes example 8 of the present disclosure, wherein example 8 also includes the subject matter according to any one of examples 1 to 7, above.

Referring generally to FIG. 1 and particularly to, e.g., FIG. 10, spar welding assembly 174 comprises induction coil 180. The preceding subject matter of this paragraph characterizes example 9 of the present disclosure, wherein example 9 also includes the subject matter according to any one of examples 1 to 8, above.

Use of induction coil 180 facilitates portability of spar welding assembly 174 and enables plurality of blade modules 316 (e.g., first blade module 116, second blade module 126, third blade module 216, fourth blade module 226, etc.) to be joined at field location 140 to form rotor blade 112. Use of induction coil 180 also facilitates a reduction in time, energy, and resources needed for forming rotor blade 112.

As illustrated in FIG. 10, in one or more examples, spar welding assembly 174 includes spar-welding tooling 420. In one or more examples, spar-welding tooling 420 includes a matched pair of spar-welding tools, identified individually as first spar-welding tool 422A and second spar-welding tool 422B. In one or more examples, first spar-welding tool 422A and second spar-welding tool 422B are formed of a material, having desirable properties. In one or more examples, desirable properties for each one of first spar-welding tool 422A and second spar-welding tool 422B include at least one of cost of material, cost of manufacture, time of manufacture, heat properties of the material, non-reactivity, rigidity, or other material properties. In one or more examples, at least one of first spar-welding tool 422A and second spar-welding tool 422B is manufactured from materials, capable of being machined.

In one or more examples, at least one of first spar-welding tool 422A and second spar-welding tool 422B are heated using heating system 424 to join adjacent spars of adjacent ones of aligned pair of modules 142. Heating system 424 is configured to heat at least one of first spar-welding tool 422A and second spar-welding tool 422B and/or the adjacent spars of adjacent ones of aligned pair of modules 142 when joining (e.g., welding) adjacent spars of adjacent ones of aligned pair of modules 142. In one or more examples, heating system 424 includes an induction-heating system. In one or more examples, the induction-heating system includes a magnetic-field generator and magnetically permeable material.

As illustrated in FIG. 10, in one or more examples, the magnetic-field generator includes induction coil 180. In one or more example, induction coil 180 includes a plurality of induction coils. In one or more examples, induction coil 180 is conformable. In one or more examples, induction coil 180 is embedded in at least one of first spar-welding tool 422A and second spar-welding tool 422B proximate to a working surface of first spar-welding tool 422A and second spar-welding tool 422B, respectively. In one or more examples, induction coil 180 is embedded in an elastomeric material (not explicitly illustrated). In one or more examples, the elastomeric material takes the form of a number of elastomeric sheets (not explicitly illustrated) that are coupled to the working surface of at least one of first spar-welding tool 422A and second spar-welding tool 422B.

In one or more examples, induction coil 180 is configured to generate a magnetic field under the control of a controller. The controller is a hardware device and controls the application of current to induction coil 180 to control the generation of the magnetic field. In one or more examples, induction coil 180 is formed of thin gauge wire. In one or more examples, induction coil 180 is a plurality of lengths of Litz wire.

In one or more examples, induction coil 180 extends across a spar-joining region between adjacent spars of adjacent ones of aligned pair of modules 142. In one or more examples, induction coil 180 extends beyond the spar-joining region and over a portion of at least one of the adjacent spars of adjacent ones of aligned pair of modules 142. In one or more examples, induction coil 180 is positioned such that a magnetic field is generated in a desired area.

In one or more examples, the magnetic field interacts with the magnetically permeable material to cause the magnetically permeable material to generate heat. The magnetically permeable material is configured to generate heat when exposed to the magnetic field. In particular, the magnetic field is an electromagnetic-flux field that interacts with the magnetically permeable material. In one or more examples, induction coil 180 is positioned such that induction coil 180 are directed orthogonal to the magnetically permeable material. In one or more examples, this positioning is selected to generate the magnetic field that desirably interacts with the magnetically permeable material.

In one or more examples, the magnetically permeable material includes one or more of various types of materials. In one or more examples, the magnetically permeable material is selected from at least one of a cobalt alloy, an iron alloy, a nickel and iron alloy, an iron and silicon alloy, an amorphous magnetic alloy, a crystalline magnetic alloy, or some other suitable material. In one or more examples, the magnetically permeable material takes the form of a smart susceptor.

In one or more examples, the magnetically permeable material has various forms or shapes. In one or more examples, the magnetically permeable material has a shape, selected from at least one of a wire, a strip, a plate, a sheet, or some other suitable shape. The particular shape selected may vary depending on the particular implementation.

In one or more examples, the magnetically permeable material is embedded in at least one of first spar-welding tool 422A and second spar-welding tool 422B proximate to the working surface of each one of first spar-welding tool 422A and second spar-welding tool 422B, respectively. In one or more examples, the magnetically permeable material is coupled to the working surface of at least one of first spar-welding tool 422A and second spar-welding tool 422B. In one or more examples, the magnetically permeable material is located between at least one of first spar-welding tool 422A and second spar-welding tool 422B and the adjacent spars of adjacent ones of aligned pair of modules 142 at the spar-joining region.

In one or more examples, the magnetically permeable material is configured to generate heat to at least soften the thermoplastic polymer of each one of the adjacent spars of adjacent ones of aligned pair of modules 142 for joining at the spar-joining region. In one or more examples, the magnetically permeable material has Curie temperature. The Curie temperature for the magnetically permeable material is selected to be at least a melting temperature for the thermoplastic polymer of the spar-joining region between the adjacent spars of adjacent ones of aligned pair of modules 142.

As illustrated in FIG. 10, in one or more examples, the magnetically permeable material includes, or takes the form of, first ferromagnetic element 181. In one or more examples, first ferromagnetic element 181 is embedded in at least one of first spar-welding tool 422A and second spar-welding tool 422B proximate to the working surface of each one of first spar-welding tool 422A and second spar-welding tool 422B, respectively. In one or more examples, first ferromagnetic element 181 is coupled to the working surface of at least one of first spar-welding tool 422A and second spar-welding tool 422B. In one or more examples, first ferromagnetic element 181 is located between at least one of first spar-welding tool 422A and second spar-welding tool 422B and the adjacent spars of adjacent ones of aligned pair of modules 142 at the spar-joining region. In one or more examples, first ferromagnetic element 181 is positioned, or is embedded, within the thermoplastic polymer of at least one of the adjacent spars of adjacent ones of aligned pair of modules 142 at the spar-joining region.

In one or more examples, spar welding assembly 174 includes a clamping system (not explicitly illustrated). The clamping system is operably coupled with at least one of first spar-welding tool 422A and second spar-welding tool 422B and is configured to move at least one of first spar-welding tool 422A and second spar-welding tool 422B relative to each other. In one or more examples, actuation of the clamping system compresses, or clamps, the adjacent spars of adjacent ones of aligned pair of modules 142 between first spar-welding tool 422A and second spar-welding tool 422B at spar-joining region. In one or more examples, the clamping system is any one of various suitable clamping devices, such as an inflatable (e.g., pneumatic) pressure clamp, a mechanical pressure clamp, and the like.

As illustrated in FIG. 10, in one or more examples, with first blade module 116 and second blade module 126 aligned (e.g., as aligned pair of modules 142), the joining end of first-module spar 120 and the joining end of second-module spar 130 are opposite to each other and abut each other. Spar welding assembly 174 is positioned proximate to spar-joining region 406 so that first-module spar 120 and second-module spar 130 are positioned between first spar-welding tool 422A and second spar-welding tool 422B. Induction coil 180 generates a magnetic field. The magnetic field interacts with first ferromagnetic element 181 to cause first ferromagnetic element 181 to generate heat.

As illustrated in FIG. 10, in one or more examples, first ferromagnetic element 181 is located between first spar-welding tool 422A and first-module spar 120 and second-module spar 130 at spar-joining region 406. In one or more examples, first ferromagnetic element 181 is located between second spar-welding tool 422B and first-module spar 120 and second-module spar 130 at spar-joining region 406.

In one or more examples, first ferromagnetic element 181 is positioned, or is embedded, within first thermoplastic polymer 122 (FIG. 1) of first-module spar 120 at spar-joining region 406. In one or more examples, first ferromagnetic element 181 includes, or takes the form of, wires embedded in first thermoplastic polymer 122 of first-module spar 120. In one or more examples, first ferromagnetic element 181 is positioned, or is embedded, within second thermoplastic polymer 132 (FIG. 1) of second-module spar 130 at spar-joining region 406. In one or more examples, first ferromagnetic element 181 includes, or takes the form of, wires embedded in second thermoplastic polymer 132 of second-module spar 130.

In one or more examples, a thermoplastic material is positioned between at least one of first spar-welding tool 422A and second spar-welding tool 422B and at least one of first-module spar 120 and second-module spar 130 at spar-joining region 406. The thermoplastic material includes a thermoplastic polymer that is compatible with first thermoplastic polymer 122 of first-module spar 120 and second thermoplastic polymer 132 of second-module spar 130. First ferromagnetic element 181 is positioned, or embedded, within the thermoplastic material.

Although not explicitly illustrated, in one or more examples, any additional internal support structures of first blade module 116 and second blade module 126, such as one or more additional first-module spars (e.g., additional first-module spar 220), one or more additional second-module spars (e.g., additional second-module spar 230), first-module ribs, second-module ribs, and other parts are also joined together using spar welding assembly 174 in a substantially similar manner, as described above and depicted in FIG. 10.

In one or more examples, spar welding assembly 174 is used to join second-module spar 130 of second blade module 126 with the third-module spar of third blade module 216 (FIG. 13) and to join the third-module spar of third blade module 216 with the fourth-module spar of fourth blade module 226 (FIG. 14). Accordingly, although FIG. 10 illustrates spar welding assembly 174 joining first-module spar 120 of first blade module 116 with second-module spar 130 of second blade module 126, the configuration, depicted in FIG. 10, and the operations, described above, for joining first-module spar 120 of first blade module 116 with second-module spar 130 of second blade module 126 are applicable in substantially the same manner for joining second-module spar 130 of second blade module 126 with the third-module spar of third blade module 216, for joining the third-module spar of third blade module 216 with the fourth-module spar of fourth blade module 226, and for joining adjacent spars of any other aligned pair of modules 142 of plurality of blade modules 316 (FIG. 2).

Referring generally to FIG. 1 and particularly to, e.g., FIG. 12, skin welding assembly 176 comprises induction coil 182. The preceding subject matter of this paragraph characterizes example 10 of the present disclosure, wherein example 10 also includes the subject matter according to any one of examples 1 to 9, above.

Use of induction coil 182 facilitates portability of skin welding assembly 176 and enables plurality of blade modules 316 (e.g., first blade module 116, second blade module 126, third blade module 216, fourth blade module 226, etc.) to be joined at field location 140 to form rotor blade. Use of induction coil 182 also facilitates a reduction in time, energy, and resources needed for forming rotor blade 112.

As illustrated in FIG. 12, in one or more examples, skin welding assembly 176 includes skin-welding tooling 426. In one or more examples, skin-welding tooling 426 includes a matched pair of spar-welding tools, identified individually as first skin-welding tool 428A and second skin-welding tool 428B. In one or more examples, first skin-welding tool 428A and second skin-welding tool 428B are formed of a material, having desirable properties. In one or more examples, desirable properties for each one of first skin-welding tool 428A and second skin-welding tool 428B include at least one of cost of material, cost of manufacture, time of manufacture, heat properties of the material, non-reactivity, rigidity, or other material properties. In one or more examples, at least one of first skin-welding tool 428A and second skin-welding tool 428B is manufactured from materials, capable of being machined.

In one or more examples, at least one of first skin-welding tool 428A and second skin-welding tool 428B are heated using heating system 430 to join adjacent skins of adjacent ones of aligned pair of modules 142. Heating system 430 is configured to heat at least one of first skin-welding tool 428A and second skin-welding tool 428B and/or at least one of adjacent skins of adjacent ones of aligned pair of modules 142 when joining (e.g., welding) the adjacent skins of adjacent ones of aligned pair of modules 142. In one or more examples, heating system 430 includes an induction-heating system. In one or more examples, the induction-heating system includes a magnetic-field generator and magnetically permeable material.

As illustrated in FIG. 12, in one or more examples, the magnetic-field generator includes induction coil 182. In one or more example, induction coil 182 includes a plurality of induction coils. In one or more examples, induction coil 182 is conformable. In one or more examples, induction coil 182 is embedded in at least one of first skin-welding tool 428A and second skin-welding tool 428B proximate to a working surface of first skin-welding tool 428A and second skin-welding tool 428B, respectively. In one or more examples, induction coil 182 is embedded in an elastomeric material (not explicitly illustrated). In one or more examples, the elastomeric material takes the form of a number of elastomeric sheets (not explicitly illustrated) that are coupled to the working surface of at least one of first skin-welding tool 428A and second skin-welding tool 428B.

In one or more examples, induction coil 182 is configured to generate a magnetic field under the control of a controller. The controller is a hardware device and controls the application of current to induction coil 182 to control the generation of the magnetic field. In one or more examples, induction coil 182 is formed of thin gauge wire. In one or more examples, induction coil 182 is a plurality of lengths of Litz wire.

In one or more examples, induction coil 182 extends across a skin-joining region between adjacent skins of adjacent ones of aligned pair of modules 142. In one or more examples, induction coil 182 extends beyond the skin-joining region and over a portion of at least one of the adjacent skins of adjacent ones of aligned pair of modules 142. In one or more examples, induction coil 182 is positioned such that a magnetic field is generated in a desired area.

In one or more examples, the magnetic field interacts with the magnetically permeable material to cause the magnetically permeable material to generate heat. The magnetically permeable material is configured to generate heat when exposed to the magnetic field. In particular, the magnetic field is an electromagnetic-flux field that interacts with the magnetically permeable material. In one or more examples, induction coil 182 is positioned such that induction coil 182 are directed orthogonal to the magnetically permeable material. In one or more examples, this positioning is selected to generate the magnetic field that desirably interacts with the magnetically permeable material.

In one or more examples, the magnetically permeable material includes one or more of various types of materials. In one or more examples, the magnetically permeable material is selected from at least one of a cobalt alloy, an iron alloy, a nickel and iron alloy, an iron and silicon alloy, an amorphous magnetic alloy, a crystalline magnetic alloy, or some other suitable material. In one or more examples, the magnetically permeable material takes the form of a smart susceptor.

In one or more examples, the magnetically permeable material has various forms or shapes. In one or more examples, the magnetically permeable material has a shape, selected from at least one of a wire, a strip, a plate, a sheet, or some other suitable shape. The particular shape selected may vary depending on the particular implementation.

In one or more examples, the magnetically permeable material is embedded in at least one of first skin-welding tool 428A and second skin-welding tool 428B proximate to the working surface of each one of first skin-welding tool 428A and second skin-welding tool 428B, respectively. In one or more examples, the magnetically permeable material is coupled to the working surface of at least one of first skin-welding tool 428A and second skin-welding tool 428B. In one or more examples, the magnetically permeable material is located between at least one of first skin-welding tool 428A and second skin-welding tool 428B and the adjacent skins of adjacent ones of aligned pair of modules 142 at the skin-joining region.

In one or more examples, the magnetically permeable material is configured to generate heat to at least soften the thermoplastic polymer of each one of the adjacent skins of adjacent ones of aligned pair of modules 142 for joining at the skin-joining region. In one or more examples, the magnetically permeable material has Curie temperature. The Curie temperature for the magnetically permeable material is selected to be at least a melting temperature for the thermoplastic polymer of the skin-joining region between the adjacent skins of adjacent ones of aligned pair of modules 142.

As illustrated in FIG. 12, in one or more examples, the magnetically permeable material includes, or takes the form of, second ferromagnetic element 183. In one or more examples, second ferromagnetic element 183 is embedded in at least one of first skin-welding tool 428A and second skin-welding tool 428B proximate to the working surface of each one of first skin-welding tool 428A and second skin-welding tool 428B, respectively. In one or more examples, second ferromagnetic element 183 is coupled to the working surface of at least one of first skin-welding tool 428A and second skin-welding tool 428B. In one or more examples, second ferromagnetic element 183 is located between at least one of first skin-welding tool 428A and second skin-welding tool 428B and the adjacent skins of adjacent ones of aligned pair of modules 142 at the skin-joining region. In one or more examples, second ferromagnetic element 183 is positioned, or is embedded, within the thermoplastic polymer of at least one of the adjacent skins of adjacent ones of aligned pair of modules 142 at the skin-joining region.

In one or more examples, skin welding assembly 176 includes a clamping system (not explicitly illustrated). The clamping system is operably coupled with at least one of first skin-welding tool 428A and second skin-welding tool 428B and is configured to move at least one of first skin-welding tool 428A and second skin-welding tool 428B relative to each other. In one or more examples, actuation of the clamping system compresses, or clamps, the adjacent skins of adjacent ones of aligned pair of modules 142 between first skin-welding tool 428A and second skin-welding tool 428B at skin-joining region. In one or more examples, the clamping system is any one of various suitable clamping devices, such as an inflatable (e.g., pneumatic) pressure clamp, a mechanical pressure clamp, and the like.

As illustrated in FIG. 12, in one or more examples, with first blade module 116 and second blade module 126 aligned (e.g., as aligned pair of modules 142), the joining end of first-module skin 118 and the joining end of second-module skin 128 are opposite to each other and abut each other. Skin welding assembly 176 is positioned proximate to skin-joining region 408 so that first-module skin 118 and second-module skin 128 are positioned between first skin-welding tool 428A and second skin-welding tool 428B. Induction coil 182 generates a magnetic field. The magnetic field interacts with second ferromagnetic element 183 to cause second ferromagnetic element 183 to generate heat.

As illustrated in FIG. 12, in one or more examples, second ferromagnetic element 183 is located between first skin-welding tool 428A and first-module skin 118 and second-module skin 128 at skin-joining region 408. In one or more examples, second ferromagnetic element 183 is located between second skin-welding tool 428B and first-module skin 118 and second-module skin 128 at skin-joining region 408.

In one or more examples, second ferromagnetic element 183 is positioned, or is embedded, within first thermoplastic polymer 122 (FIG. 1) of first-module skin 118 at skin-joining region 408. In one or more examples, second ferromagnetic element 183 includes, or takes the form of, wires embedded in first thermoplastic polymer 122 of first-module skin 118. In one or more examples, second ferromagnetic element 183 is positioned, or is embedded, within second thermoplastic polymer 132 (FIG. 1) of second-module skin 128 at skin-joining region 408. In one or more examples, second ferromagnetic element 183 includes, or takes the form of, wires embedded in second thermoplastic polymer 132 of second-module skin 128.

In one or more examples, a thermoplastic material is positioned between at least one of first skin-welding tool 428A and second skin-welding tool 428B and at least one of first-module skin 118 and second-module skin 128 at skin-joining region 408. The thermoplastic material includes a thermoplastic polymer that is compatible with first thermoplastic polymer 122 of first-module skin 118 and second thermoplastic polymer 132 of second-module skin 128. Second ferromagnetic element 183 is positioned, or is embedded, within the thermoplastic material.

In one or more examples, skin welding assembly 176 is used to join second-module skin 128 of second blade module 126 with third-module skin 218 of third blade module 216 (FIG. 13) and to join third-module skin 218 of third blade module 216 with fourth-module skin 228 of fourth blade module 226 (FIG. 14). Accordingly, although FIG. 12 illustrates skin welding assembly 176 joining first-module skin 118 of first blade module 116 with second-module skin 128 of second blade module 126, the configuration, depicted in FIG. 12, and the operations, described above, for joining first-module skin 118 of first blade module 116 with second-module skin 128 of second blade module 126 are applicable in substantially the same manner for joining second-module skin 128 of second blade module 126 with third-module skin 218 of third blade module 216, for joining third-module skin 218 of third blade module 216 with fourth-module skin 228 of fourth blade module 226, and for joining adjacent skins of any other aligned pair of modules 142 of plurality of blade modules 316 (FIG. 2).

Referring generally to FIGS. 2-14 and particularly to, e.g., FIG. 15, method 1000 of manufacturing rotor blade 112 is disclosed. Method 1000 comprises (block 1002) assembling, at factory location 114, first blade module 116. First blade module 116 defines first-module span axis $A_{M1}$ and comprises first-module skin 118 and first-module spar 120. Each of first-module skin 118 and first-module spar 120 comprises first thermoplastic polymer 122 and first reinforcement material 124. Method 1000 further comprises (block 1004) assembling second blade module 126. Second blade module 126 defines second-module span axis $A_{M2}$ and comprises second-module skin 128 and second-module spar 130. Each of second-module skin 128 and second-module spar 130 comprises second thermoplastic polymer 132 and second reinforcement material 134. Method 1000 also comprises (block 1006) transporting first blade module 116 and second blade module 126 to field location 140. Method 1000 additionally comprises (block 1008) aligning, at field location 140, first-module span axis $A_{M1}$ of first blade module 116 with second-module span axis $A_{M2}$ of second blade module 126 to define aligned pair of modules 142. Method 1000 further comprises (block 1010) heating portion of aligned pair of modules 142 to form weld joint 144 between first-module spar 120 and second-module spar 130. The preceding subject matter of this paragraph characterizes example 11 of the present disclosure.

Method 1000 enables modularity in design of rotor blade 112. Modular design of rotor blade 112 enables plurality of blade modules 316 (FIG. 2) to be assembled at factory location 114 and to be connected together at field location 140 to form rotor blade 112. Accordingly, method 1000 facilitates a reduction in manufacturing cycle time, an increase in production capacity, and a reduction in tooling costs. Further, modular design of rotor blade 112 enables plurality of blade modules 316 to be transported from factory location 114 to field location 140, rather than rotor blade 112 as a whole, which, in one or more examples, is extremely large when fully assembled. Accordingly, method 1000 eases the challenges associated with transporting rotor blade 112 in a fully assembled condition.

In one or more examples, rotor blade 112 is a composite structure, made according to method 1000. In one or more examples, rotor blade 112 is a modular composite structure and each one of plurality of blade modules 316 is characterized by a particular construction, a particular function, a particular characteristic, a particular material composition, and/or particular location on rotor blade 112. In one or more examples, each one of plurality of blade modules 316 defines or forms a section or segment of rotor blade 112. As such, in one or more examples, different types of rotor blades are constructed using different combinations of blade modules. Additionally, improved properties of the thermoplastic material (e.g., first thermoplastic polymer 122 and second thermoplastic polymer 132) forming rotor blade 112 facilitate manufacture of rotor blade 112 having a lighter and more durable construction.

In one or more examples, more than one module of each type of module is manufactured according to method 1000. In one or more examples, one or more of plurality of blade modules 316 are the same (e.g., are of the same type, have the same construction, have the same geometry, have the same material composition, etc.). In one or more examples, one or more of plurality of blade modules 316 are different (e.g., are of different types, have different constructions, have different geometries, have different material composition, etc.).

In one or more examples, substantially similar ones of plurality of blade modules 316 (e.g., modules of the same type) are interchangeable with each other. In one or more examples, substantially similar ones of plurality of blade modules 316 (e.g., modules of the same type) are used to construct rotor blade 112. In one or more examples, different ones of plurality of blade modules 316 (e.g., modules of different types) are used to construct rotor blade 112.

According to method 1000, in one or more examples, rotor blade 112 includes, or is formed from, four blade modules 316, identified individually as first blade module 116, second blade module 126, third blade module 216, and fourth blade module 226, as illustrated in FIG. 2. In one or more examples, rotor blade 112 includes, or is formed from, less than four or more than four blade modules.

In one or more examples, more than one first blade module 116, more than one second blade module 126, more than one third blade module 216, and/or more than one fourth blade module 226 are manufactured according to method 1000. As such, in one or more examples, a plurality of rotor blades is constructed, wherein each rotor blade 112 includes first blade module 116, second blade module 126, third blade module 216, and fourth blade module 226. Further, in one or more examples, any one of first blade module 116, second blade module 126, third blade module 216, or fourth blade module 226 is replaced with a different one of first blade module 116, second blade module 126, third blade module 216, or fourth blade module 226, such as during service or repair of rotor blade 112.

In one or more examples, first blade module 116 is made from composite material. In one or more examples, first-module skin 118 and first-module spar 120 are made from composite material.

According to method 1000, in one or more examples, first-module skin 118 forms an exterior surface, or shell, of first blade module 116, as illustrated in FIG. 3. First-module spar 120 forms an internal support structure of first blade module 116. In one or more examples, first blade module 116 includes one or more additional internal support structures, such as one or more additional first-module spars (e.g., additional first-module spar 220), first-module ribs, and other parts.

In one or more examples, second blade module 126 is made from composite material. In one or more examples, second-module skin 128 and second-module spar 130 are made from composite material.

According to method 1000, in one or more examples, second-module skin 128 forms an exterior surface, or shell, of second blade module 126, as illustrated in FIG. 4. Second-module spar 130 forms an internal support structure of second blade module 126. In one or more examples, second blade module 126 includes one or more additional internal support structures, such as one or more additional second-module spars (e.g., additional second-module spar 230), second-module ribs, and other parts.

In one or more examples, third blade module 216 (FIG. 2) includes third-module skin 218 (FIG. 13) and a third-module spar (not explicitly illustrated). In one or more examples, third blade module 216 is made from composite material and third-module skin 218 and the third-module spar are made from composite material. In one or more examples, each of third-module skin 218 and the third-module spar includes a third thermoplastic polymer and a third reinforcement material. Third-module skin 218 forms an exterior surface, or shell, of third blade module 216. The third-module spar forms an internal support structure of third blade module 216. In one or more examples, third blade module 216 includes one or more additional internal support structures, such as one or more additional third-module spars, third-module ribs, and other parts.

In one or more examples, fourth blade module 226 (FIG. 2) includes fourth-module skin 228 (FIG. 14) and a fourth-module spar (not explicitly illustrated). In one or more examples, fourth blade module 226 is made from composite material and fourth-module skin 228 and the fourth-module spar are made from composite material. In one or more examples, each of fourth-module skin 228 and the fourth-module spar includes a fourth thermoplastic polymer and a fourth reinforcement material. Fourth-module skin 228 forms an exterior surface, or shell, of fourth blade module 226. The fourth-module spar forms an internal support structure of fourth blade module 226. In one or more examples, fourth blade module 226 includes one or more additional internal support structures, such as one or more additional fourth-module spars, fourth-module ribs, and other parts.

According to method 1000, in one or more examples, other ones of plurality of blade modules 316 have components and/or composite material similar to that of first blade module 116 and second blade module 126.

According to method 1000, in one or more examples, factory location 114 (FIG. 1) refers to a first location where at least one of first blade module 116 and any other one of plurality of blade modules 316 (FIG. 2) are manufactured. First tooling 170 is located at factory location 114 for manufacturing first blade module 116 (e.g., number of first blade modules). In one or more examples, different ones of plurality of blade modules 316 are manufactured at different factory locations. As such, in one or more examples, system 100 includes a number of factory locations, each factory location 114 configured for manufacturing one or more of plurality of blade modules 316.

According to method 1000, in one or more examples, field location 140 (FIG. 1) refers to a second location, which is different than the first location of factory location 114, where rotor blade 112 is constructed or assembled from first blade module 116 and second blade module 126 and, optionally, additional ones of plurality of blade modules 316 (FIG. 2). In other words, field location 140 is geographically separated from factory location 114. First support 160, second support 162, spar welding assembly 174, and skin welding assembly 176 are located at field location 140 for assembly of rotor blade 112. In one or more examples, field location 140 is, or is proximately located relative to, a delivery location of rotor blade 112, an installation location of rotor blade 112, a service location of rotor blade 112, or similar location.

According to method 1000, in one or more examples, (block 1006) transporting first blade module 116 and second blade module 126 to field location 140 is performed using transportation vehicle 178. In one or more examples, transportation vehicle 178 (FIG. 1) enables one or more of plurality of blade modules 316 (FIG. 2), such as first blade module 116, to be easily transported from factory location 114 to field location 140 for assembly of rotor blade 112. In one or more examples, transportation vehicle 178 includes a number of transportation vehicles, each transportation vehicle 178 being used for one portion of the trip from factory location 114 to field location 140. In one or more examples, transportation vehicle 178 includes at least one of a truck, a train, a ship, an aircraft, and the like, depending, for example, on the distance between factory location 114 and field location 140, the terrain between factory location 114 and field location 140, the number of blade modules being transported, and other factors.

According to method 1000, in one or more examples, (block 1002) assembling first blade module 116 is performed using first tooling 170. In one or more examples, first tooling 170 includes any suitable tooling device capable of manufacturing and assembling first blade module 116 from first-module skin 118 and first-module spar 120.

According to method 1000, in one or more examples, (block 1004) assembling second blade module 126 is performed using second tooling 172. In one or more examples, second tooling 172 includes any suitable tooling device capable of manufacturing and assembling second blade module 126 from second-module skin 128 and second-module spar 130.

In one or more examples, method 1000 includes assembling third blade module 216. In one or more examples, third blade module 216 is assembled at factory location. In one or more examples, assembling third blade module 216 is performed using third tooling (not illustrated). In one or more examples, the third tooling includes any suitable tooling device capable of manufacturing and assembling third blade module 216 from the third-module skin and the third-module spar.

In one or more examples, method 1000 includes assembling fourth blade module 226. In one or more examples, fourth blade module 226 is assembled at factory location. In one or more examples, the fourth tooling includes any suitable tooling device capable of manufacturing and assembling fourth blade module 226 from the fourth-module skin and the fourth-module spar.

In one or more examples, method 1000 includes assembling plurality of blade modules 316 (FIG. 2) using the number of tooling devices. In one or more examples, the number of tooling devices is located at factory location 114.

According to method 1000, in one or more examples, first blade module 116 and second blade module 126 are joined or are otherwise connected together following (block 1008) aligning first-module span axis $A_{M1}$ and second-module span axis $A_{M2}$, as illustrated in FIG. 9. Joining of first blade module 116 and second blade module 126 is performed using at least one of spar welding assembly 174 (FIGS. 1 and 10) and skin welding assembly 176 (FIGS. 1, 11, and 12).

According to method 1000, in one or more examples, (block 1010) heating portion of aligned pair of modules 142 to form weld joint 144 between first-module spar 120 and second-module spar 130 is performed using spar welding assembly 174. As illustrated in FIGS. 1 and 10 and described herein above, in one or more examples, spar welding assembly 174 includes any suitable thermoplastic welding device capable to joining first-module spar 120 with the second-module spar 130.

As illustrated in FIG. 10, in one or more examples, method 1000 includes locally heating and melting first thermoplastic polymer 122 of first-module spar 120 and second thermoplastic polymer 132 of second-module spar 130 about spar-joining region 406 to fuse first-module spar 120 and second-module spar 130 together along weld joint 144 using spar welding assembly 174. In one or more examples, spar welding assembly 174 includes, or takes the form of, at least one of a hot-gas welding device, an ultrasonic welding device, a spin welding device, a vibration welding device, a contact welding device, a laser welding device, a hot-plate welding device, and an induction welding device.

As illustrated in FIGS. 9 and 10, in one or more examples, following (block 1008) aligning first-module span axis $A_{M1}$ of first blade module 116 and second-module span axis $A_{M2}$ of second blade module 126, method 1000 includes securing first blade module 116 and second blade module 126 in an aligned position (e.g., as aligned pair of modules 142). When first blade module 116 and second blade module 126 are aligned and held in the aligned position, the joining end of first-module spar 120 and the joining end of second-module spar 130 are opposite to each other and abut each other, as illustrated in FIG. 10. A localized region surrounding the joining end of first-module spar 120 and the joining end of second-module spar 130 defines spar-joining region 406 at weld joint 144.

As illustrated in FIG. 10, in one or more examples, method 1000 includes positioning spar welding assembly 174 proximate to (e.g., at or near) spar-joining region 406, such as about opposing and abutting ends of first-module spar 120 and second-module spar 130, and forming weld joint 144 between first-module spar 120 and second-module spar 130. In one or more examples, spar welding assembly 174 at least partially surrounds first-module spar 120 and second-module spar 130 at spar-joining region 406 (i.e., surrounds at least a portion of a perimeter of first-module spar 120 and second-module spar 130). In one or more examples, spar welding assembly 174 completely surrounds first-module spar 120 and second-module spar 130 at spar-joining region 406 (i.e., surrounds an entirety of the perimeter of first-module spar 120 and second-module spar 130).

As illustrated in FIG. 10, in one or more examples, method 1000 includes forming access opening 432 in first blade module 116 and/or second blade module 126 to enable spar welding assembly 174 to access first-module spar 120 and second-module spar 130 at spar-joining region 406. In one or more examples, a portion of first-module skin 118 and/or a portion of second-module skin 128 are removed (e.g., cut away) to form access opening 432 and to provide access to first-module spar 120 and second-module spar 130 at spar-joining region 406 by spar welding assembly 174.

In one or more examples, after (block 1010) heating portion of aligned pair of modules 142 and forming weld joint 144 to join first-module spar 120 and second-module spar 130 (e.g., using spar welding assembly 174), method 1000 includes applying or joining a composite charge (e.g., formed of a number of plies or sheets of composite material) to first-module skin 118 and second-module skin 128 to cover access opening 432 and enclose first blade module 116 and/or second blade module 126. In one or more examples, the composite charge is joined to first-module skin 118 and second-module skin 128 using skin welding assembly 176.

In one or more examples, method 1000 includes heating another portion of aligned pair of modules 142 to form another weld joint between any additional internal support structures of first blade module 116 and second blade module 126, such as one or more additional first-module spars (e.g., additional first-module spar 220), one or more additional second-module spars (e.g., additional second-module spar 230), first-module ribs, second-module ribs, and other parts, for example, using spar welding assembly 174.

In one or more examples, method 1000 includes aligning, at field location 140, second-module span axis $A_{M2}$ of second blade module 126 with third-module span axis $A_{M3}$ of third blade module 216 to define aligned pair of modules 142, as illustrated in FIG. 13. In one or more examples, method 1000 includes heating a portion of aligned pair of modules 142 to form another weld joint between second-module spar 130 and the third-module spar (not explicitly illustrated) to join first blade module 116 and second blade module 126.

Although not illustrated, the operational steps, utilized and/or performed for aligning second-module span axis $A_{M2}$ of the second blade module 126 with third-module span axis $A_{M3}$ of third blade module 216 (FIG. 13) to define aligned pair of modules 142, are substantially similar to the operational steps, utilized and/or performed for aligning first-module span axis $A_{M1}$ of first blade module 116 with second-module span axis $A_{M2}$ of second blade module 126 to define aligned pair of modules 142, as described herein and depicted in FIGS. 1, 2, 8, and 9.

Although not illustrated, the operational steps, utilized and/or performed for heating portion of aligned pair of modules 142 to form another weld joint between second-module spar 130 and the third-module spar to join second blade module 126 and third blade module 216 (FIG. 13), are substantially similar to the operational steps, utilized and/or performed for heating portion of aligned pair of modules 142 to form weld joint 144 between first-module spar 120 and second-module spar 130 to join first blade module 116 and second blade module 126, as described herein and depicted in FIGS. 1 and 10.

In one or more examples, method 1000 includes aligning, at field location 140, third-module span axis $A_{M3}$ of third blade module 216 with fourth-module span axis $A_{M4}$ of fourth blade module 226 to define aligned pair of modules 142, as illustrated in FIG. 14. In one or more examples, method 1000 includes heating portion of aligned pair of modules 142 to form another weld joint between the third-module spar (not explicitly illustrated) and the fourth-module spar (not explicitly illustrated).

Although not illustrated, the operational steps, utilized and/or performed for aligning third-module span axis $A_{M3}$ of third blade module 216 with fourth-module span axis $A_{M4}$ of fourth blade module 226 (FIG. 14) to define aligned pair of modules 142, are substantially similar to the operational steps, utilized and/or performed for aligning first-module span axis $A_{M1}$ of first blade module 116 with second-module span axis $A_{M2}$ of second blade module 126 to define aligned pair of modules 142, as described herein and depicted in FIGS. 1, 2, 8, and 9.

Although not illustrated, the operational steps utilized and/or performed for heating portion of aligned pair of modules 142 to form another weld joint between the third-module spar and the fourth-module spar to join third blade module 216 and fourth blade module 226 (FIG. 14) are substantially similar to the operational steps, utilized and/or performed for heating portion of aligned pair of modules 142 to form weld joint 144 between first-module spar 120 and second-module spar 130 to join first blade module 116 and second blade module 126, as described herein and depicted in FIGS. 1 and 10.

Referring generally to FIGS. 1, 3, and 5-7 and particularly to, e.g., FIG. 15, according to method 1000, first-module skin 118 comprises first-module upper skin portion 150 and first-module lower skin portion 152. According to method 1000, (block 1002) assembling, at factory location 114, first blade module 116 comprises (block 1012) joining together first-module upper skin portion 150, first-module lower skin portion 152, and first-module spar 120. The preceding subject matter of this paragraph characterizes example 12 of the present disclosure, wherein example 12 also includes the subject matter according to example 11, above.

Joining together first-module upper skin portion 150, first-module lower skin portion 152, and first-module spar 120 at factory location 114 facilitates manufacturing and assembling first blade module 116 at factory location 114 and transporting first blade module 116 from factory location 114 to field location 140.

According to method 1000, in one or more examples, (block 1012) joining together first-module upper skin portion 150, first-module lower skin portion 152, and first-module spar 120 is performed using first tooling 170, as illustrated in FIGS. 5-7. In one or more examples, method 1000 includes forming first-module upper skin portion 150 of first-module skin 118 using first matched pair of tools 169 of first tooling 170, as described herein above and depicted in FIG. 5. In one or more examples, method 1000 includes forming first-module lower skin portion 152 of first-module skin 118 using second matched pair of tools 173 of first tooling 170, as described herein above and depicted in FIG. 6. According to method 1000, in one or more examples, (block 1012) joining together first-module upper skin portion 150, first-module lower skin portion 152, and first-module spar 120 includes forming first blade module 116 by cooperatively using tool (e.g., first tool 169A) of first matched pair of tools 169 and tool (e.g., fourth tool 173B) of second matched pair of tools 173, as described herein above and depicted in FIG. 7.

Referring generally to FIGS. 1, 3, and 7 and particularly to, e.g., FIG. 15, according to method 1000, (block 1012) joining together first-module upper skin portion 150, first-module lower skin portion 152, and first-module spar 120 comprises (block 1014) inductively heating portions of first-module upper skin portion 150, first-module lower skin portion 152, and first-module spar 120. The preceding subject matter of this paragraph characterizes example 13 of the present disclosure, wherein example 13 also includes the subject matter according to example 12, above.

Inductively heating portions of first-module upper skin portion 150, first-module lower skin portion 152, and first-module spar 120 to join together first-module upper skin portion 150, first-module lower skin portion 152, and first-module spar 120 and to form first blade module 116 facilitates a reduction in time, energy, and resources needed for forming first blade module 116.

As illustrated in FIG. 7, according to method 1000, in one or more examples, first tooling 170 includes the inductive-heating system (e.g., heating system 418), configured to inductively heat at least one of tool of first matched pair of tools 169 (e.g., first tool 169A), tool of second matched pair of tools 173 (e.g., fourth tool 173B), and/or first-module upper skin portion 150, first-module lower skin portion 152, and first-module spar 120 during (block 1012) joining together first-module upper skin portion 150, first-module lower skin portion 152, and first-module spar 120 to form first blade module 116. In one or more examples, the inductive heating system is configured, includes components, and operates as described above and depicted in FIG. 7.

Referring generally to FIGS. 1 and 4 and particularly to, e.g., FIG. 15, according to method 1000, (block 1004) assembling second blade module 126 comprises (block 1016) assembling second blade module 126 at factory location 114. The preceding subject matter of this paragraph characterizes example 14 of the present disclosure, wherein example 14 also includes the subject matter according to any one of examples 11 to 13, above.

Assembling second blade module 126 at factory location 114 enables first blade module 116 and second blade module 126 to be manufactured and assembled at the same location, which facilitates a reduction in manufacturing cycle time, an increase in production capacity, and a reduction in tooling costs.

Referring generally to FIGS. 1 and 4 and particularly to, e.g., FIG. 15 according to method 1000, second-module skin 128 comprises second-module upper skin portion 154 and second-module lower skin portion 156. According to method 1000, (block 1004) assembling second blade module 126 comprises (block 1018) joining together second-module upper skin portion 154, second-module lower skin portion 156, and second-module spar 130. The preceding subject matter of this paragraph characterizes example 15 of the present disclosure, wherein example 15 also includes the subject matter according to any one of examples 11 to 14, above.

Joining together second-module upper skin portion 154, second-module lower skin portion 156, and second-module spar 130 at factory location 114 facilitates manufacturing and assembling second blade module 126 at factory location 114 and transporting second blade module 126 from factory location 114 to field location 140, with first blade module 116.

According to method 1000, in one or more examples, (block 1018) joining together second-module upper skin portion 154, second-module lower skin portion 156, and second-module spar 130 is performed using second tooling 172 (FIG. 1). In one or more examples, method 1000 includes forming second-module upper skin portion 154 of second-module skin 128 using a first matched pair of tools of second tooling 172. In one or more examples, method 1000 includes forming second-module lower skin portion 156 of second-module skin 128 using a second matched pair of tools of second tooling 172. According to method 1000, in one or more examples, (block 1018) joining together second-module upper skin portion 154, second-module lower skin portion 156, and second-module spar 130 includes forming second blade module 126 by cooperatively using a tool (e.g., a first tool) of the first matched pair of tools of second tooling 172 and a tool (e.g., a fourth tool) of the second matched pair of tools of second tooling 172.

Although not explicitly illustrated, in one or more examples, the operations, performed for (block 1004) assembling second blade module 126 and (block 1018) joining together second-module upper skin portion 154, second-module lower skin portion 156, and second-module spar 130, are substantially similar to the operations, performed for (block 1002) assembling first blade module 116 and (block 1012) joining together first-module upper skin portion 150, first-module lower skin portion 152, and first-module spar 120, as described herein above and depicted in FIGS. 5-7.

Referring generally to FIGS. 1, 4, 11, and 12 and particularly to, e.g., FIG. 15, according to method 1000, (block 1018) joining together second-module upper skin portion 154, second-module lower skin portion 156, and second-module spar 130 comprises (block 1020) inductively heating portions of second-module upper skin portion 154, second-module lower skin portion 156, and second-module spar 130. The preceding subject matter of this paragraph characterizes example 16 of the present disclosure, wherein example 16 also includes the subject matter according to example 15, above.

Inductively heating portions of second-module upper skin portion 154, second-module lower skin portion 156, and second-module spar 130 to join together second-module upper skin portion 154, second-module lower skin portion 156, and second-module spar 130 and to form second blade module 126 facilitates a reduction in time, energy, and resources needed for forming second blade module 126.

According to method 1000, in one or more examples, second tooling 172 includes the inductive heating system (e.g., heating system 418), configured to inductively heat at least one of the tool of the first matched pair of tools of second tooling 172, the tool of the second matched pair of tools of second tooling 172, and/or second-module upper skin portion 154, second-module lower skin portion 156, and second-module spar 130 during (block 1018) joining together second-module upper skin portion 154, second-module lower skin portion 156, and second-module spar 130 to form second blade module 126.

Although not illustrated, in one or more examples, the operations, performed for (block 1020) inductively heating portions of second-module upper skin portion 154, second-module lower skin portion 156, and second-module spar 130, are substantially similar to the operations, performed for (block 1014) inductively heating portions of first-module upper skin portion 150, first-module lower skin portion 152, and first-module spar 120, as described herein above and depicted in FIG. 7.

Referring generally to FIG. 1 and particularly to, e.g., FIG. 15 according to method 1000, first thermoplastic polymer 122 of first blade module 116 has a composition that is equivalent to that of second thermoplastic polymer 132 of second blade module 126. The preceding subject matter of this paragraph characterizes example 17 of the present disclosure, wherein example 17 also includes the subject matter according to any one of examples 11 to 16, above.

First thermoplastic polymer 122 of first blade module 116 and second thermoplastic polymer 132 of second blade module 126 having compositions that are equivalent to each other enables any one of various plastic welding techniques to be used to join first blade module 116 and second blade module 126 together at field location 140.

As used herein, the term "equivalent" refers to a condition that is exactly the same as, or identical to, the stated condition or a condition that is substantially the same as the stated condition. As used herein, the phrase "substantially the same" refers to a condition that is similar to an extent that it may be perceived as being exact. Thus, in one or more examples, the phrase "A is equivalent to B" encompasses conditions in which A is exactly the same as B, or where A is within a predetermined allowable variance of (e.g., +/−5%) of B, or vice versa.

Generally, in one or more examples, first thermoplastic polymer 122 of first blade module 116 and second thermoplastic polymer 132 of second blade module 126 having equivalent compositions means that first thermoplastic polymer 122 and second thermoplastic polymer 132 are compatible with each other to form a weld joint between components when a joining region between adjacent, and abutting, components is heated, melted, and joined. In particular, first thermoplastic polymer 122 of first blade module 116 and second thermoplastic polymer 132 of second blade module 126 having equivalent compositions means that first thermoplastic polymer 122 and second thermoplastic polymer 132 are compatible with each other to form a weld joint between components when the joining region between adjacent, and abutting, components is inductively heated, melted, and joined.

According to method 1000, in one or more examples, first thermoplastic polymer 122 (FIG. 1) of first-module skin 118 and/or first-module spar 120 includes, or takes the form of, at least one of polycarbonate, acetal copolymer polyoxymethlene, acetal homopolymer polyoxymethylene, acrylic, polyester, vinyl ester, nylon, polyethylene, polypropylene, polystyrene, polyvinyl chloride, polytetrafluoroethylene, and the like. In one or more examples, first thermoplastic polymer 122 also includes additives or other materials, such as plasticizers and the like.

According to method 1000, in one or more examples, second thermoplastic polymer 132 (FIG. 1) of second-module skin 128 and/or second-module spar 130 includes, or takes the form of, at least one of polycarbonate, acetal copolymer polyoxymethylene, acetal homopolymer polyoxymethylene, acrylic, polyester, vinyl ester, nylon, polyethylene, polypropylene, polystyrene, polyvinyl chloride, polytetrafluoroethylene, and the like. In one or more examples, second thermoplastic polymer 132 also includes additives or other materials, such as plasticizers and the like.

According to method 1000, in or more examples, the thermoplastic polymer of one or more of plurality of blade modules 316 (FIG. 1) has a composition that is equivalent to that of the thermoplastic polymer of another one or more of plurality of blade modules 316.

Referring generally to FIG. 1 and particularly to, e.g., FIG. 15, according to method 1000, first reinforcement material 124 of first blade module 116 has a composition that is different from that of second reinforcement material 134 of second blade module 126. The preceding subject matter of this paragraph characterizes example 18 of the present disclosure, wherein example 18 also includes the subject matter according to any one of examples 11 to 17, above.

First reinforcement material 124 of first blade module 116 and second reinforcement material 134 of second blade module 126 having compositions that are different from each other enables one or more characteristics and/or properties of each one of first blade module 116 and second blade module 126 to be tailored to a particular application.

In one or more examples, first reinforcement material 124 (FIG. 1) of first-module skin 118 and/or first-module spar 120 includes, or takes the form of, reinforcing fibers. In one or more examples, the reinforcing fibers of first reinforcement material 124 include at least one of glass fibers (fiberglass), carbon (graphite) fibers, aramid fibers, boron fibers, ceramic fibers, and the like. In one or more examples, the reinforcing fibers of first reinforcement material 124 are unidirectional or take the form of a woven or nonwoven cloth, fabric, or tape.

In one or more examples, second reinforcement material 134 (FIG. 1) of second-module skin 128 and/or second-module spar 130 includes, or takes the form of, reinforcing fibers. In one or more examples, the reinforcing fibers of second reinforcement material 134 include at least one of glass fibers (fiberglass), carbon (graphite) fibers, aramid fibers, boron fibers, ceramic fibers, and the like. In one or more examples, the reinforcing fibers of second reinforcement material 134 are unidirectional or take the form of a woven or nonwoven cloth, fabric, or tape.

Generally, in one or more examples, first reinforcement material 124 of first blade module 116 and second reinforcement material 134 of second blade module 126 having different compositions means that first reinforcement material 124 includes, or takes the form of, a first type of reinforcement material or a first type of reinforcing fiber and that second reinforcement material 134 includes, or takes the form of, a second type of reinforcement material or a second type of reinforcing fiber. In such examples, the first type of reinforcing fiber is different than the second type of reinforcement material and/or the first type of reinforcing fiber is different than the second type of reinforcing fiber. In one or more examples, the difference between first reinforcement material 124 and second reinforcement material 134 includes material composition of the reinforcement material or reinforcing fibers.

In one or more examples, first reinforcement material 124 of first blade module 116 (e.g., of first-module spar 120 and/or first-module skin 118) includes, or takes for form of, first material fibers and second reinforcement material 134 of second blade module 126 (e.g., of second-module spar 130 and/or second-module skin 128) includes, or takes the form of, second material fibers. For example, first reinforcement material 124 of first blade module 116 includes glass fibers and second reinforcement material 134 of second blade module 126 includes carbon fibers.

In one or more examples, first reinforcement material 124 of first blade module 116 includes, or takes for form of, first-combination material fibers (e.g., first hybrid) and second reinforcement material 134 of second blade module 126 includes, or takes the form of, second-combination material fibers (e.g., second hybrid). For example, first reinforcement material 124 of first blade module 116 includes a combination of glass fibers and carbon fibers and second reinforcement material 134 of second blade module 126 includes a combination of glass fibers and aramid fibers.

In one or more examples, first reinforcement material 124 of first blade module 116 includes, or takes for form of, first-combination material fibers and second reinforcement material 134 of second blade module 126 includes, or takes the form of, second material fibers. For example, first reinforcement material 124 of first blade module 116 includes a combination of glass fibers and carbon fibers and second reinforcement material 134 of second blade module 126 includes carbon fibers.

According to method 1000, in or more examples, the reinforcement material of one or more of plurality of blade modules 316 (FIG. 1) has a composition that is different from that of the reinforcement material of another one or more of plurality of blade modules 316.

Referring generally to FIG. 1 and particularly to, e.g., FIG. 15, according to method 1000, first reinforcement material 124 of first blade module 116 has fiber load that is substantially different from that of second reinforcement material 134 of second blade module 126. The preceding subject matter of this paragraph characterizes example 19 of the present disclosure, wherein example 19 also includes the subject matter according to any one of examples 11 to 18, above.

First reinforcement material 124 of first blade module 116 and second reinforcement material 134 of second blade module 126 having a substantially different fiber load enables one or more characteristics and/or properties of each one of first blade module 116 and second blade module 126 to be tailored to a particular application.

As used herein, the term "fiber load" refers to a mass, or weight, of the reinforcement material per unit volume of the thermoplastic polymer. As such, in one or more examples, the term "fiber load" refers to the density, or more precisely, the volumetric mass density, of the reinforcement material per unit volume.

For the purpose of the present disclosure, the phrase "substantially different" refers to a condition that is different to a significant or great extent.

In one or more examples, the difference between first reinforcement material 124 and second reinforcement material 134 includes the density of the reinforcing material or the density of the reinforcing fibers.

In one or more examples, first reinforcement material 124 of first blade module 116 (e.g., of first-module spar 120 and/or first-module skin 118) has a first fiber load. Second reinforcement material 134 of second blade module 126 (e.g., of second-module spar 130 and/or second-module skin 128) has a second fiber load. The first fiber load and the second fiber load are substantially different. Generally, in one or more examples, a greater fiber load of the reinforcement material results in a greater strength (e.g., tensile strength) of the composite component. As such, in one or more examples, first blade module 116 has a first strength and second blade module 126 has a second strength.

In one or more examples, the fiber load of first reinforcement material 124 of first blade module 116 and/or of second reinforcement material 134 of second blade module 126 is selected based, at least in part, on the loads, stresses, strains, and/or forces that will be applied to the respective blade module during operation of rotor blade 112. Similarly, in one or more examples, the fiber load of the third reinforcement material of third blade module 216 and/or of the fourth reinforcement material of fourth blade module 226 is selected based, at least in part, on the loads, stresses, strains, and/or forces that will be applied to the respective blade module during operation of rotor blade 112.

The present disclosure recognizes and takes into account that different portions of rotor blade 112 experience different loads, stresses, strains, and/or forces during operation of rotor blade 112. For example, the blade module, forming a base portion of rotor blade 112 (e.g., first blade module 116 in the illustrative example of FIG. 2), and/or the blade module, forming a tip portion of rotor blade 112 (e.g., fourth blade module 226 in the illustrative example of FIG. 2), experience greater loads, stresses, strains, and/or forces that the blade modules, forming an intermediate portion of rotor blade 112 (e.g., second blade module 126 and third blade module 216 in the illustrative example of FIG. 2). As such, in one or more examples, the fiber load of the reinforcement material of any one of plurality of blade modules 316 (FIG. 2) is selected (e.g., increased or decreased) based on a location of the corresponding of blade module on rotor blade 112.

According to method 1000, in or more examples, the fiber load of the reinforcement material of one or more of plurality of blade modules 316 (FIG. 1) is different from the fiber load of the reinforcement material of another one or more of plurality of blade modules 316.

Referring generally to FIG. 1 and particularly to, e.g., FIG. 15, according to method 1000, first reinforcement material 124 of first blade module 116 has fiber-orientation arrangement that is substantially different from that of second reinforcement material 134 of second blade module 126. The preceding subject matter of this paragraph characterizes example 20 of the present disclosure, wherein example 20 also includes the subject matter according to any one of examples 11 to 19, above.

First reinforcement material 124 of first blade module 116 and second reinforcement material 134 of second blade module 126 having a substantially different fiber-orientation arrangement enables one or more characteristics and/or properties of each one of first blade module 116 and second blade module 126 to be tailored to a particular application.

In one or more examples, the difference between the fiber-orientation arrangement of first reinforcement material 124 and the fiber-orientation arrangement of second reinforcement material 134 includes the form of the reinforcing material or the form of the reinforcing fibers, such as unidirectional vs. randomly oriented reinforcing fibers, woven vs. nonwoven reinforcement material, and the like.

In one or more examples, the difference between the fiber-orientation arrangement of first reinforcement material 124 and the fiber-orientation arrangement of second reinforcement material 134 includes the ply-to-ply fiber orientation of the reinforcement material of any one or more of plurality of blade modules 316.

In one or more examples, first reinforcement material 124 of first blade module 116 (e.g., of first-module spar 120 and/or first-module skin 118) has a first fiber-orientation arrangement. Second reinforcement material 134 of second blade module 126 (e.g., of second-module spar 130 and/or second-module skin 128) has a second fiber-orientation arrangement. The first fiber-orientation arrangement and the second fiber-orientation arrangement are substantially different.

Generally, in one or more examples, the fiber-orientation arrangement of the reinforcement material of a given blade module affects the material property of the blade module, such as the strength of the blade module. As such, in one or more examples, first blade module 116 has a first strength and second blade module 126 has a second strength.

In one or more examples, the fiber-orientation arrangement of first reinforcement material 124 of first blade module 116 and/or of second reinforcement material 134 of second blade module 126 is selected based, at least in part, on the loads, stresses, strains, and/or forces that will be applied to the respective blade module during operation of rotor blade 112. Similarly, in one or more examples, the fiber-orientation arrangement of the third reinforcement material of third blade module 216 and/or of the fourth reinforcement material of fourth blade module 226 is selected based, at least in part, on the loads, stresses, strains, and/or forces that will be applied to the respective blade module during operation of rotor blade 112.

The present disclosure recognizes and takes into account that different portions of rotor blade 112 experience different loads, stresses, strains, and/or forces during operation of rotor blade 112. For example, the blade module forming a base portion of rotor blade 112 (e.g., first blade module 116 in the illustrative example of FIG. 2) and/or the blade module forming a tip portion of rotor blade 112 (e.g., fourth blade module 226 in the illustrative example of FIG. 2) experience greater loads, stresses, strains, and/or forces that the blade modules forming an intermediate portion of rotor blade 112 (e.g., second blade module 126 and third blade module 216 in the illustrative example of FIG. 2). As such, in one or more examples, the fiber-orientation arrangement of the reinforcement material of any one of plurality of blade modules 316 (FIG. 2) is selected based on a location of the corresponding blade module on rotor blade 112.

According to method 1000, in or more examples, the fiber-orientation arrangement of the reinforcement material of one or more of plurality of blade modules 316 (FIG. 1) is different from the fiber-orientation arrangement of the reinforcement material of another one or more of plurality of blade modules 316.

Referring generally to FIG. 1 and particularly to, e.g., FIG. 15, according to method 1000, field location 140 is at least 1 kilometer away from factory location 114. The preceding subject matter of this paragraph characterizes example 21 of the present disclosure, wherein example 21 also includes the subject matter according to any one of examples 11 to 20, above.

Referring generally to FIG. 1 and particularly to, e.g., FIG. 15, according to method 1000, field location 140 is at least 100 kilometers away from factory location 114. The preceding subject matter of this paragraph characterizes example 22 of the present disclosure, wherein example 22 also includes the subject matter according to any one of examples 11 to 21, above.

Referring generally to FIGS. 1, 8, and 9 and particularly to, e.g., FIG. 15, according to method 1000, (block 1008) aligning, at field location 140, first-module span axis $A_{M1}$ of first blade module 116 with second-module span axis $A_{M2}$ of second blade module 126 comprises at least one of (block 1022) orienting first blade module 116 about first-module span axis $A_{M1}$ or (block 1024) orienting second blade module 126 about second-module span axis $A_{M2}$. The preceding subject matter of this paragraph characterizes example 23 of the present disclosure, wherein example 23 also includes the subject matter according to any one of examples 11 to 22, above.

Orienting first blade module 116 about first-module span axis $A_{M1}$ or orienting second blade module 126 about second-module span axis $A_{M2}$ enables selective alignment of first blade module 116 and second blade module 126 to form aligned pair of modules 142 and at least partially define rotor-blade span axis $A_S$ of rotor blade 112.

In one or more examples, (block 1022) orienting first blade module 116 about first-module span axis $A_{M1}$ includes selectively adjusting a location and/or angular orientation of first blade module 116 using first support 160, as described herein above and illustrated in FIGS. 8 and 9. In one or more examples, (block 1024) orienting second blade module 126 about second-module span axis $A_{M5}$ includes selectively adjusting a location and/or angular orientation of second blade module 126 using second support 162, as described above and illustrated in FIGS. 8 and 9.

In one or more examples, method 1000 includes aligning, at field location 140, second-module span axis $A_{M2}$ of second blade module 126 with third-module span axis $A_{M3}$ of third blade module 216 by orienting second blade module 126 about second-module span axis $A_{M2}$, using second support 162, or by orienting third blade module 216 about third-module span axis $A_{M3}$, using third support 260, as described herein above and illustrated in FIGS. 8 and 13.

In one or more examples, method 1000 includes aligning, at field location 140, third-module span axis $A_{M3}$ of third blade module 216 with fourth-module span axis $A_{M4}$ of fourth blade module 226 by orienting third blade module 216 about third-module span axis $A_{M3}$, using third support 260, or by orienting fourth blade module 226 about fourth-module span axis $A_{M4}$, using fourth support 262, as described herein above and illustrated in FIGS. 8 and 14.

Referring generally to FIGS. 1, 8, and 9 and particularly to, e.g., FIG. 15, method 1000 further comprises, prior to (block 1008) aligning, at field location 140, first-module span axis $A_{M1}$ of first blade module 116 with second-module span axis $A_{M2}$ of second blade module 126, (block 1026) mounting first blade module 116 on first support 160 and mounting second blade module 126 on second support 162. The preceding subject matter of this paragraph characterizes example 24 of the present disclosure, wherein example 24 also includes the subject matter according to any one of examples 11 to 23, above.

Mounting first blade module 116 on first support 160 and mounting second blade module 126 on second support 162 facilitates orienting first blade module 116 about first-module span axis $A_{M1}$ and orienting second blade module 126 about second-module span axis $A_{M2}$ to selectively align first blade module 116 and second blade module 126 to form aligned pair of modules 142 and at least partially define rotor-blade span axis $A_S$ of rotor blade 112.

According to method 1000, in one or more examples, one or more of plurality of supports 360, such as first support 160, second support 162, third support 260, and/or fourth support 262, includes alignment device 402 and collar 404, as illustrated in FIGS. 8, 9, 13, and 14.

In one or more examples, collar 404 is configured to hold a corresponding one of plurality of blade modules 316. In one or more examples, collar 404 of first support 160 holds first blade module 116 and collar 404 of second support 162 holds second blade module 126 when (block 1026) mounting first blade module 116 on first support 160 and mounting second blade module 126 on second support 162.

In one or more examples, alignment device 402 is configured to selectively adjust a location (e.g., vertical and horizontal location) of collar 404 and an angular orientation of collar 404, which in turn, selectively adjusts a location (e.g., vertical and horizontal location) of a corresponding one of plurality of blade modules 316 and an angular orientation of a corresponding one of plurality of blade modules 316. In one or more examples, alignment device 402 of first support 160 adjusts the position (e.g., location and orientation) of first blade module 116 and alignment device 402 of second support 162 adjusts the position of second blade module 126 during (block 1008) aligning, at field location 140, first-module span axis $A_{M1}$ of first blade module 116 with second-module span axis $A_{M2}$ of second blade module 126.

In one or more examples, prior to aligning, at field location 140, second-module span axis $A_{M2}$ of second blade module 126 with third-module span axis $A_{M3}$ of third blade module 216, method 1000 includes mounting third blade module 216 on third support 260. In one or more examples, collar 404 of third support 260 holds third blade module 216 when mounting third blade module 216 on third support 260. In one or more examples, alignment device 402 of third support 260 adjusts the position of third blade module 216 when aligning, at field location 140, second-module span axis $A_{M2}$ of second blade module 126 with third-module span axis $A_{M3}$ of third blade module 216.

In one or more examples, prior to aligning, at field location 140, third-module span axis $A_{M3}$ of third blade module 216 with fourth-module span axis $A_{M4}$ of fourth blade module 226, method 1000 includes mounting fourth blade module 226 on fourth support 262. In one or more examples, collar 404 of fourth support 262 holds fourth blade module 226 when mounting fourth blade module 226 on fourth support 262. In one or more examples, alignment device 402 of fourth support 262 adjusts the position of fourth blade module 226 when aligning, at field location 140, third-module span axis $A_{M3}$ of third blade module 216 with fourth-module span axis $A_{M4}$ of fourth blade module 226.

Referring generally to FIGS. 1, 9, and 10 and particularly to, e.g., FIG. 15, according to method 1000, (block 1010) heating portion of aligned pair of modules 142 comprises (block 1028) heating portion of aligned pair of modules 142 at field location 140. The preceding subject matter of this paragraph characterizes example 25 of the present disclosure, wherein example 25 also includes the subject matter according to any one of examples 11 to 24, above.

Heating portion of aligned pair of modules 142 at field location 140 enables joining of first-module spar 120 and second-module spar 130 at field location 140 to at least partially join first blade module 116 and second blade module 126 at field location 140 and at least partially assemble rotor blade 112 at field location 140.

Referring generally to FIGS. 1 and 10 and particularly to, e.g., FIG. 15, according to method 1000, portion of aligned pair of modules 142 comprises first ferromagnetic element 181. According to method 1000, (block 1010) heating portion of aligned pair of modules 142 comprises (block 1030) inductively heating first ferromagnetic element 181. The preceding subject matter of this paragraph characterizes example 26 of the present disclosure, wherein example 26 also includes the subject matter according to any one of examples 11 to 25, above.

Inductively heating first ferromagnetic element 181 to heat and join portion of aligned pair of modules 142 enables a spar-welding operation to be performed at field location 140 and facilitates a reduction in time, energy, and resources needed for forming rotor blade 112.

According to method 1000, in one or more examples, (block 1030) inductively heating first ferromagnetic element 181 to form weld joint 144 between first-module spar 120 and second-module spar 130 is performed using spar welding assembly 174. In one or more examples, spar welding assembly 174 includes spar-welding tooling 420 and the induction-heating system (e.g., heating system 424), as described herein above and illustrated in FIG. 10. In one or more examples, the induction-heating system includes the magnetic-field generator and magnetically permeable material, as described herein above and illustrated in FIG. 10. In one or more examples, the magnetic-field generator includes induction coil 180, as described herein above and illustrated in FIG. 10. In one or more examples, the magnetically permeable material includes, or takes the form of, first ferromagnetic element 181, as described herein above and illustrated in FIG. 10.

Referring generally to FIGS. 1, 11, and 12 and particularly to, e.g., FIG. 15, method 1000 further comprises (block 1032) heating different portion of aligned pair of modules 142 to form second weld joint 166 between first-module skin 118 to second-module skin 128. The preceding subject matter of this paragraph characterizes example 27 of the present disclosure, wherein example 27 also includes the subject matter according to any one of examples 11 to 26, above.

Heating different portion of aligned pair of modules 142 to form second weld joint 166 between first-module skin 118 to second-module skin 128 further joins first blade module 116 and second blade module 126 when assembling rotor blade 112 at field location 140.

According to method 1000, in one or more examples, (block 1032) heating different portion of aligned pair of modules 142 to form second weld joint 166 between first-module spar 120 and second-module spar 130 is performed using skin welding assembly 176. As illustrated in FIGS. 1, 11, and 12 and described herein above, in one or more examples, skin welding assembly 176 includes any suitable thermoplastic welding device capable to joining first-module skin 118 with second-module skin 128.

As illustrated in FIGS. 11 and 12, in one or more examples, method 1000 includes locally heating and melting first thermoplastic polymer 122 of first-module skin 118 and second thermoplastic polymer 132 of second-module skin 128 about skin-joining region 408 to fuse first-module skin 118 and second-module skin 128 together along second weld joint 166. In one or more examples, skin welding assembly 176 includes, or takes the form of, at least one of a hot-gas welding device, an ultrasonic welding device, a spin welding device, a vibration welding device, a contact welding device, a laser welding device, a hot-plate welding device, and an induction welding device.

As illustrated in FIGS. 9-12, in one or more examples, following (block 1008) aligning first-module span axis $A_{M1}$ of first blade module 116 and second-module span axis $A_{M2}$ of second blade module 126 and (block 1010) heating portion of aligned pair of modules 142 to form weld joint 144 between first-module spar 120 and second-module spar 130, first blade module 116 and second blade module 126 are in the aligned position (e.g., as aligned pair of modules 142). When first blade module 116 and second blade module 126 are aligned and held in the aligned position, the joining end of first-module skin 118 and the joining end of second-module skin 128 are opposite to each other and abut each other, as illustrated in FIGS. 10, 11, and 12. A localized region, surrounding the joining end of first-module skin 118 and the joining end of second-module skin 128, defines spar-joining region 406 at second weld joint 166, as illustrated in FIGS. 11 and 12.

As illustrated in FIGS. 11 and 12, in one or more examples, method 1000 includes positioning skin welding assembly 176 proximate to (e.g., at or near) skin-joining region 408, such as about opposing and abutting ends of first-module skin 118 and second-module skin 128, and forming second weld joint 166 between first-module skin 118 and second-module skin 128. In one or more examples, skin welding assembly 176 at least partially surrounds first-module skin 118 and second-module skin 128 at skin-joining region 408 (i.e., surrounds at least a portion of a perimeter of first-module skin 118 and second-module skin 128). In one or more examples, skin welding assembly 176 completely surrounds first-module skin 118 and second-module skin 128 at skin-joining region 408 (i.e., surrounds an entirety of the perimeter of first-module skin 118 and second-module skin 128).

In one or more examples, within second-module span axis $A_{M2}$ of second blade module 126 aligned with third-module span axis $A_{M3}$ of third blade module 216 to define aligned pair of modules 142, as illustrated in FIG. 13, method 1000 includes heating a different portion of aligned pair of modules 142 to form another second weld joint between second-module skin 128 and third-module skin 218 to join second blade module 126 and third blade module 216.

Although not illustrated, the operational steps, utilized and/or performed for heating a different portion of aligned pair of modules 142 to form another second weld joint between second-module skin 128 and third-module skin 218 to join second blade module 126 and third blade module 216 (FIG. 13), are substantially similar to the operational steps, utilized and/or performed for heating portion of aligned pair of modules 142 to form second weld joint 166 between first-module skin 118 and second-module skin 128 to join first blade module 116 and second blade module 126 as described herein and depicted in FIGS. 1, 11, and 12.

In one or more examples, with third-module span axis $A_{M3}$ of the third blade module 216 aligned with fourth-module span axis $A_{M4}$ of fourth blade module 226 to define aligned pair of modules 142, as illustrated in FIG. 14, method 1000 includes heating a different portion of aligned pair of modules 142 to form another second weld joint between third-module skin 218 and fourth-module skin 228.

Although not illustrated, the operational steps utilized and/or performed for heating portion of aligned pair of modules 142 to form another second weld joint between third-module skin 218 and fourth-module skin 228 to join third blade module 216 and fourth blade module 226 (FIG. 14) are substantially similar to the operational steps utilized and/or performed for heating portion of aligned pair of modules 142 to form second weld joint 166 between first-module skin 118 and second-module skin 128 to join first blade module 116 and second blade module 126 as described herein and depicted in FIGS. 1, 11, and 12.

Referring generally to FIGS. 1, 11, and 12, and particularly to, e.g., FIG. 15, according to method 1000, (block 1032) heating different portion of aligned pair of modules 142 comprises (block 1034) heating different portion of aligned pair of modules 142 at field location 140. The preceding subject matter of this paragraph characterizes example 28 of the present disclosure, wherein example 28 also includes the subject matter according to example 27, above.

Heating different portion of aligned pair of modules 142 at field location 140 enables joining of first-module skin 118 and second-module skin 128 at field location 140 to at least partially join first blade module 116 and second blade module 126 at field location 140 and at least partially assemble rotor blade 112 at field location 140.

Referring generally to FIGS. 1, 11, and 12 and particularly to, e.g., FIG. 15, according to method 1000, different portion of aligned pair of modules 142 comprises second ferromagnetic element 183. According to method 1000, (block 1032) heating different portion of aligned pair of modules 142 comprises (block 1036) inductively heating second ferromagnetic element 183. The preceding subject matter of this paragraph characterizes example 29 of the present disclosure, wherein example 29 also includes the subject matter according to example 27, above.

Inductively heating second ferromagnetic element 183 to heat and join portion of aligned pair of modules 142 enables a skin-welding operation to be performed at field location 140 and facilitates a reduction in time, energy, and resources needed for forming rotor blade 112.

According to method 1000, in one or more examples, (block 1036) inductively heating second ferromagnetic element 183 to form second weld joint 166 between first-module skin 118 and second-module skin 128 is performed using skin welding assembly 176. In one or more examples, skin welding assembly 176 includes skin-welding tooling 426 and the induction-heating system (e.g., heating system 430), as described herein above and illustrated in FIGS. 11 and 12. In one or more examples, the induction-heating system includes the magnetic-field generator and magnetically permeable material, as described herein above and illustrated in FIGS. 11 and 12. In one or more examples, the magnetic-field generator includes induction coil 182, as described herein above and illustrated in FIGS. 11 and 12. In one or more examples, the magnetically permeable material includes, or takes the form of, second ferromagnetic element 183, as described herein above and illustrated in FIGS. 11 and 12.

Referring to FIGS. 1-15, rotor blade 112, manufactured according to method 1000 is disclosed. The preceding subject matter of this paragraph characterizes example 30 of the present disclosure, wherein example 30 also includes the subject matter according to any one of examples 11 to 29, above.

Rotor blade 112 is an example of a modular rotor blade manufactured according to method 1000 and using system 100.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of manufacturing a rotor blade, the method comprising steps of:
    assembling, at a factory location, a first blade module, and wherein:
        the first blade module defines a first-module span axis $Ai_{m1}$ and comprises a first-module skin and a first-module spar; and
        each of the first-module skin and the first-module spar comprises a first thermoplastic polymer and a first reinforcement material;
    assembling a second blade module, and wherein:
        the second blade module defines a second-module span axis $A_{M2}$ and comprises a second-module skin and a second-module spar; and
        each of the second-module skin and the second-module spar comprises a second thermoplastic polymer and a second reinforcement material;
    transporting the first blade module and the second blade module to a field location;
    aligning, at the field location, the first-module span axis $Ai_{m1}$ of the first blade module with the second-module span axis $A_{M2}$ of the second blade module to define an aligned pair of modules; and heating a portion of the aligned pair of modules to form a weld joint between the first-module spar and the second-module spar.

2. The method according to claim 1, wherein:
the first-module skin comprises a first-module upper skin portion and a first-module lower skin portion; and
the step of assembling, at the factory location, the first blade module comprises joining together the first-module upper skin portion, the first-module lower skin portion, and the first-module spar.

3. The method according to claim 2, wherein the step of joining together the first-module upper skin portion, the first-module lower skin portion, and the first-module spar comprises inductively heating portions of the first-module upper skin portion, the first-module lower skin portion, and the first-module spar.

4. The method according to claim 1, wherein the step of assembling the second blade module comprises assembling the second blade module at the factory location.

5. The method according to claim 1, wherein:
the second-module skin comprises a second-module upper skin portion and a second-module lower skin portion; and
the step of assembling the second blade module comprises joining together the second-module upper skin portion, the second-module lower skin portion and the second-module spar.

6. The method according to claim 5, wherein the step of joining together the second-module upper skin portion, the second-module lower skin portion, and the second-module spar comprises inductively heating portions of the second-module upper skin portion, the second-module lower skin portion, and the second-module spar.

7. The method according to claim 1, wherein the step of aligning, at the field location, the first-module span axis $Ai_{M1}$ of the first blade module with the second-module span axis $A_{M2}$ of the second blade module comprises at least one of orienting the first blade module about the first-module span axis $Ai_{M1}$ or orienting the second blade module about the second-module span axis $A_{M2}$.

8. The method according to claim 1, further comprising, prior to the step of aligning, at the field location, the first-module span axis $A_{M1}$ of the first blade module with the second-module span axis $A_{M2}$ of the second blade module, mounting the first blade module on a first support and mounting the second blade module on a second support.

9. The method according to claim 1, wherein the step of heating the portion of the aligned pair of modules comprises heating the portion of the aligned pair of modules at the field location.

10. The method according to claim 1, wherein:
the portion of the aligned pair of modules comprises a first ferromagnetic element, and
the step of heating the portion of the aligned pair of modules comprises inductively heating the first ferromagnetic element.

11. The method according to claim 1, further comprising a step of heating a different portion of the aligned pair of modules to form a second weld joint between the first-module skin to the second-module skin.

12. The method according to claim 11, wherein the step of heating the different portion of the aligned pair of modules comprises heating the different portion of the aligned pair of modules at the field location.

13. The method according to claim 1, wherein the first thermoplastic polymer of the first blade module has a composition that is equivalent to that of the second thermoplastic polymer of the second blade module.

14. The method according to claim 1, wherein the first reinforcement material of the first blade module has a composition that is different from that of the second reinforcement material of the second blade module.

15. The method according to claim 1, wherein the first reinforcement material of the first blade module has a fiber load that is substantially different from that of the second reinforcement material of the second blade module.

16. The method according to claim 1, wherein the first reinforcement material of the first blade module has a fiber-orientation arrangement that is substantially different from that of the second reinforcement material of the second blade module.

17. The method according to claim 1, wherein the field location is at least 1 kilometer away from the factory location.

18. The method according to claim 1, wherein the field location is at least 100 kilometers away from the factory location.

19. The method according to claim 11, wherein:
the different portion of the aligned pair of modules comprises a second ferromagnetic element, and
the step of heating the different portion of the aligned pair of modules comprises inductively heating the second ferromagnetic element.

20. The method according to claim 10, further comprising a step of heating a different portion of the aligned pair of modules to form a second weld joint between the first-module skin to the second-module skin.

* * * * *

UNITED STATES PATENT AND TRADEMARK OFFICE
CERTIFICATE OF CORRECTION

PATENT NO. : 10,814,559 B2  
APPLICATION NO. : 16/226854  
DATED : October 27, 2020  
INVENTOR(S) : Matsen et al.

Page 1 of 1

It is certified that error appears in the above-identified patent and that said Letters Patent is hereby corrected as shown below:

In the Claims

Column 48 In Claim 1, Line 50:  
Change $Ai_{m1}$ to $A_{M1}$

Column 48 In Claim 1, Line 65:  
Change $Ai_{m1}$ to $A_{M1}$

Column 49 In Claim 7, Line 35:  
Change $Ai_{M1}$ to $A_{M1}$

Column 49 In Claim 7, Line 38:  
Change $Ai_{M1}$ to $A_{M1}$

Signed and Sealed this  
First Day of December, 2020

Andrei Iancu  
*Director of the United States Patent and Trademark Office*